US012163791B2

(12) United States Patent
Liu

(10) Patent No.: US 12,163,791 B2
(45) Date of Patent: Dec. 10, 2024

(54) MOTION GRAPH CONSTRUCTION AND LANE LEVEL ROUTE PLANNING

(71) Applicant: Motional AD LLC, Boston, MA (US)

(72) Inventor: Shih-Yuan Liu, Cambridge, MA (US)

(73) Assignee: Motional AD LLC, Boston, MA (US)

( * ) Notice: Subject to any disclaimer, the term of this patent is extended or adjusted under 35 U.S.C. 154(b) by 222 days.

(21) Appl. No.: 17/819,074

(22) Filed: Aug. 11, 2022

(65) Prior Publication Data

US 2022/0381563 A1 Dec. 1, 2022

Related U.S. Application Data

(63) Continuation of application No. 16/682,095, filed on Nov. 13, 2019, now Pat. No. 11,604,071.

(60) Provisional application No. 62/777,667, filed on Dec. 10, 2018.

(51) Int. Cl.
*G01C 21/34* (2006.01)
*G05D 1/00* (2024.01)

(52) U.S. Cl.
CPC .......... *G01C 21/34* (2013.01); *G05D 1/0088* (2013.01)

(58) Field of Classification Search
CPC ........ B60K 2360/166; B60K 2360/175; B60K 35/00; B60K 35/28; B60W 50/14; B60W 60/001; G01C 21/34; G01C 21/3407; G01C 21/3446; G01C 21/3453; G01C 21/3658; G01C 21/3815; G01C 21/387; G05D 1/0088
See application file for complete search history.

(56) References Cited

U.S. PATENT DOCUMENTS

| 5,513,110 | A  | * | 4/1996 | Fujita ................. G01C 21/3446 340/995.22 |
| 9,140,573 | B2 | * | 9/2015 | Piloff ................. G01C 21/3667 |
| 11,320,275 | B2 | * | 5/2022 | Gelhar ............... G01C 21/3453 |

(Continued)

FOREIGN PATENT DOCUMENTS

| CN | 108778882 | 11/2018 |
| KR | 2018-0040760 | 4/2018 |

OTHER PUBLICATIONS

GB Office Action in British Appln. No. 2104215.5, dated Dec. 1, 2022, 4 pages.

(Continued)

*Primary Examiner* — Tyler J Lee
(74) *Attorney, Agent, or Firm* — Fish & Richardson P.C.

(57) ABSTRACT

Using a planning circuit of a vehicle, a map is accessed that includes information identifying at least one lane on which vehicles can travel. Using the planning circuit and from the map, a graph representing a driving environment of the vehicle is generated. The graph includes multiple trajectories. At least one trajectory includes a lane change. Each trajectory is a path for the vehicle to move from a first spatiotemporal location to a second spatiotemporal location. The trajectory includes at least one lane alone which the vehicle can move. Using the planning circuit, a trajectory of the multiple trajectories for the vehicle to travel is selected based on an initial vehicle trajectory of the vehicle. The selected trajectory includes a stem. The stem is a portion of the selected trajectory to which the vehicle is configured to adhere. Using the control circuit, the vehicle is moved along the selected trajectory.

18 Claims, 23 Drawing Sheets

(56) References Cited

U.S. PATENT DOCUMENTS

| | | | |
|---|---|---|---|
| 11,604,071 B2 | 3/2023 | Liu | |
| 2003/0065674 A1* | 4/2003 | Otsuki | G01C 21/34 |
| 2006/0271286 A1 | 11/2006 | Rosenberg | |
| 2010/0161192 A1 | 6/2010 | Nara et al. | |
| 2010/0286909 A1* | 11/2010 | Tate, Jr. | G01C 21/3446 |
| | | | 180/65.21 |
| 2011/0251783 A1* | 10/2011 | Doi | G01C 21/3446 |
| | | | 701/532 |
| 2014/0207325 A1 | 7/2014 | Mudalige et al. | |
| 2014/0278052 A1 | 9/2014 | Slavin et al. | |
| 2015/0057917 A1 | 2/2015 | Cheng | |
| 2015/0345966 A1 | 12/2015 | Meuleau et al. | |
| 2016/0209227 A1* | 7/2016 | Nagy | G01C 21/3676 |
| 2016/0314687 A1* | 10/2016 | Koshizen | B60W 40/04 |
| 2017/0154529 A1 | 6/2017 | Zhao et al. | |
| 2017/0242437 A1 | 8/2017 | Chan et al. | |
| 2017/0242438 A1 | 8/2017 | Chan et al. | |
| 2017/0277193 A1 | 9/2017 | Frazzoli et al. | |
| 2017/0277195 A1 | 9/2017 | Frazzoli et al. | |
| 2017/0357262 A1 | 12/2017 | Dix et al. | |
| 2018/0088576 A1 | 5/2018 | Kong et al. | |
| 2018/0129203 A1 | 5/2018 | Tafti et al. | |
| 2018/0150080 A1 | 5/2018 | Gross et al. | |
| 2018/0150081 A1 | 5/2018 | Gross et al. | |
| 2018/0188372 A1* | 7/2018 | Wheeler | G01S 17/86 |
| 2018/0267548 A1* | 9/2018 | Sumioka | G08G 1/16 |
| 2018/0281785 A1 | 10/2018 | Berntorp et al. | |
| 2018/0345991 A1 | 12/2018 | Mimura et al. | |
| 2019/0084561 A1 | 3/2019 | Takeda et al. | |
| 2019/0265042 A1 | 8/2019 | Prasad et al. | |
| 2019/0317508 A1* | 10/2019 | Zhang | G08G 1/096725 |
| 2019/0325234 A1* | 10/2019 | Zhu | G05D 1/0088 |
| 2019/0346845 A1 | 11/2019 | Rottkamp | |
| 2020/0018614 A1 | 1/2020 | Duan et al. | |
| 2020/0089245 A1 | 3/2020 | Yadmellat et al. | |
| 2020/0126410 A1 | 4/2020 | Voncken et al. | |
| 2020/0132477 A1 | 4/2020 | Averilla | |
| 2020/0132488 A1 | 4/2020 | Slutskyy et al. | |
| 2020/0133280 A1 | 4/2020 | Seccamonte et al. | |
| 2020/0156631 A1 | 5/2020 | Lin et al. | |
| 2020/0182633 A1 | 6/2020 | Liu et al. | |
| 2020/0189588 A1 | 6/2020 | Aoki et al. | |
| 2020/0363806 A1 | 11/2020 | Kobilarov | |

OTHER PUBLICATIONS

[No Author Listed] "Surface Vehicle Recommended Practice: Taxonomy and Definitions for Terms Related to Driving Automation Systems for On-Road Moto Vehicles," SAE International, Sep. 30, 2016, 30 pages.

Althoff et al., "Closed-loop safety assessment of uncertain roadmaps," Autonomous Robots, Jul. 17, 2015, 40: 267-289.

DÆRIK [online], "My Experience with Tesla's Navigate on Autopilot," Presented by DAERIK on Nov. 5, 2018, retrieved on Feb. 11, 2020, Retrieved from <https://youtu.be/iCNUFE9hJRk?t=168 >, 1 pages [Video Submission].

DK 1st Technical Examination in Danish Appln. No. PA201970148, dated May 10, 2019, 9 pages.

DK 2nd Technical Examination in Danish Appln. No. PA201970148, dated Nov. 15, 2019, 3 pages.

DK 3rd Technical Examination in Danish Appln. No. PA201970148, dated Jun. 17, 2020, 6 pages.

KR Office Action in Korean Appln. No. 10-2021-7008827, dated Aug. 17, 2022, 19 pages (with English translation).

PCT International Preliminary Report on Patentability in International Appln. No. PCT/IB2019/060570, dated Jun. 24, 2021, 10 pages.

PCT International Search Report and Written Opinion in International Appln. No. PCT/IB2019/060570, dated Mar. 25, 2020, 14 pages.

* cited by examiner

MOTION GRAPH CONSTRUCTION AND LANE LEVEL ROUTE PLANNING

CROSS-REFERENCE TO RELATED APPLICATIONS

This application is a continuation of U.S. application Ser. No. 16/682,095, filed Nov. 13, 2019 (now allowed), which claims the benefit of U.S. Provisional Application 62/777,667, filed on Dec. 10, 2018, which is incorporated herein by reference in its entirety.

FIELD OF THE INVENTION

This description relates to motion graph construction and lane level route planning.

BACKGROUND

A road that connects one location (e.g., an origin) and another location (e.g., a destination) in a geographic region can include one or more turns. The road can also include multiple lanes. An autonomous vehicle driving on the road may need to change lanes, for example, when turning. Lane changes can be abrupt, e.g., can involve a short transverse movement over a short longitudinal distance, or can be gradual, e.g., can involve a long transverse movement over a long longitudinal distance.

SUMMARY

Techniques are provided for a method implemented by a computer, e.g., a computer onboard an autonomous vehicle. A planning circuit of the vehicle accesses a map of a geographic region. The map includes information identifying at least one lane on which vehicles can travel in the geographic region. From the map, the planning circuit generates a graph representing a driving environment of the vehicle. The graph includes multiple trajectories. At least one trajectory includes a lane change. Each trajectory of the multiple trajectories is a path for the vehicle to autonomously move from a first spatiotemporal location on the map to a second spatiotemporal location on the map. The trajectory includes at least one lane along which the vehicle can move. The planning circuit selects a trajectory of the multiple trajectories for the vehicle to travel based on an initial vehicle trajectory of the vehicle. The selected trajectory includes a stem. The stem is a portion of the selected trajectory to which the vehicle is configured to adhere. The control circuit moves the vehicle along the selected trajectory.

Techniques are provided for a vehicle that includes a planning circuit, a memory, and at least one program stored in the memory. The at least one program includes instructions executable by the planning circuit to perform any or all of the methods described in this disclosure.

Techniques are provided for a computer-readable storage medium including at least one program for execution by a planning circuit of a device. The at least one program includes instructions which, when executed by the planning circuit, cause the vehicle to perform any or all of the methods described in this disclosure.

Certain aspects of the subject matter described here can be implemented as a method. Using a planning circuit of a vehicle, a map of a geographic region is accessed. The map includes information identifying at least one lane on which vehicles can travel in the geographic region. Using the planning circuit and from the map, a graph representing a driving environment of the vehicle is generated. The graph includes multiple trajectories. At least one trajectory includes a lane change. Each trajectory is a path for the vehicle to autonomously move from a first spatiotemporal location on the map to a second spatiotemporal location on the map. The trajectory includes at least one lane alone which the vehicle can move. Using the planning circuit, a trajectory of the multiple trajectories for the vehicle to travel is selected based on an initial vehicle trajectory of the vehicle. The selected trajectory includes a stem. The stem is a portion of the selected trajectory to which the vehicle is configured to adhere. Using the control circuit, the vehicle is moved along the selected trajectory.

Aspects of the disclosure combinable with any of the other aspects include the following features. At least the stem of the selected trajectory is traveled upon commencing travel of the selected trajectory.

Aspects of the disclosure combinable with any of the other aspects include the following features. A subsequent trajectory is selected for the vehicle to travel after traveling the stem of the trajectory.

Aspects of the disclosure combinable with any of the other aspects include the following features. The subsequent trajectory originates from an end of the stem of the selected trajectory.

Aspects of the disclosure combinable with any of the other aspects include the following features. Each trajectory of the multiple trajectories includes a respective stem representing a respective portion of a respective path represented by the corresponding trajectory to which the vehicle is configured to adhere.

Aspects of the disclosure combinable with any of the other aspects include the following features. The graph of the driving environment of the vehicle represents a smaller geographic area compared to the map of the geographic region.

Aspects of the disclosure combinable with any of the other aspects include the following features. The graph of the driving environment of the vehicle includes more driving details about the geographic area compared to driving details about the geographic area included in the map of the geographic region.

Aspects of the disclosure combinable with any of the other aspects include the following features. A first trajectory of the multiple trajectories represents a path for the vehicle to travel in a lane. To generate a trajectory of the multiple trajectories, a lane is identified within a geographic area represented by the driving environment. Within the lane, a starting node representing a starting spatiotemporal location and an ending node representing an ending spatiotemporal location are identified. An edge is generated from the starting node to the ending node. The edge represents a trajectory between the starting spatiotemporal location and the ending spatiotemporal location.

Aspects of the disclosure combinable with any of the other aspects include the following features. The lane is a first lane. To generate the at least one trajectory involving the lane change, a second lane adjacent the first lane is identified. An edge from the ending node to a node representing a spatiotemporal location in the second lane is generated. The edge represents a trajectory crossing the first lane to the second lane.

Aspects of the disclosure combinable with any of the other aspects include the following features. The edge from the ending node to the node representing the spatiotemporal location in the second lane includes a transition based on factors affecting the traveling of the vehicle from the ending node to the spatiotemporal location in the second lane. The factors include one or more of a shortest distance between the ending node and the node representing the spatiotemporal location, a shortest time to travel between the ending node and the node representing the spatiotemporal location, speed constraints to travel in the first lane or the second lane or driving conditions in the driving environment.

Aspects of the disclosure combinable with any of the other aspects include the following features. A sequence including the edge from the starting node to the ending node and the edge from the ending node to the node representing the spatiotemporal location in the second lane is generated.

Aspects of the disclosure combinable with any of the other aspects include the following features. An identifier is assigned to the sequence.

Aspects of the disclosure combinable with any of the other aspects include the following features. The graph is a first graph. The geographic area is a second geographic area. While the vehicle is traveling in the geographic area represented by the driving environment, a second geographic area adjacent the first geographic area in which the vehicle will travel at a future time instant is determined. A second graph of a driving environment representing the second geographic area is generated.

Aspects of the disclosure combinable with any of the other aspects include the following features. The second graph is generated in real time.

Aspects of the disclosure combinable with any of the other aspects include the following features. To generate the graph, a weight is assigned to a respective trajectory of the multiple trajectories. The weight represents resources consumed by the vehicle to travel the respective trajectory.

Aspects of the disclosure combinable with any of the other aspects include the following features. To assign the weight to the respective trajectory, a greater weight is assigned to a trajectory representing a lane change in a short road block compared to a weight assigned to a trajectory representing the lane change in a comparatively longer road block.

Aspects of the disclosure combinable with any of the other aspects include the following features. The initial vehicle trajectory represents a location and a travel direction of the vehicle at a time instant of selecting the trajectory.

Aspects of the disclosure combinable with any of the other aspects include the following features. The trajectory of the multiple trajectories for the vehicle to travel based on the initial vehicle trajectory minimizes resources consumed by the vehicle to travel from the first spatiotemporal location to the second spatiotemporal location.

Certain aspects of the subject matter can be implemented as a vehicle. The vehicle includes a planning circuit, a memory, and at least one program stored in the memory that includes instructions executable by the planning circuit to perform one or more or all aspects of the subject matter described here in any combination.

Certain aspects of the subject matter can be implemented as a computer-readable storage medium including at least one program that includes instructions executable by a planning circuit of a vehicle to perform one or more or all aspects of the subject matter described here in any combination.

DETAILED DESCRIPTION

Figure 1:
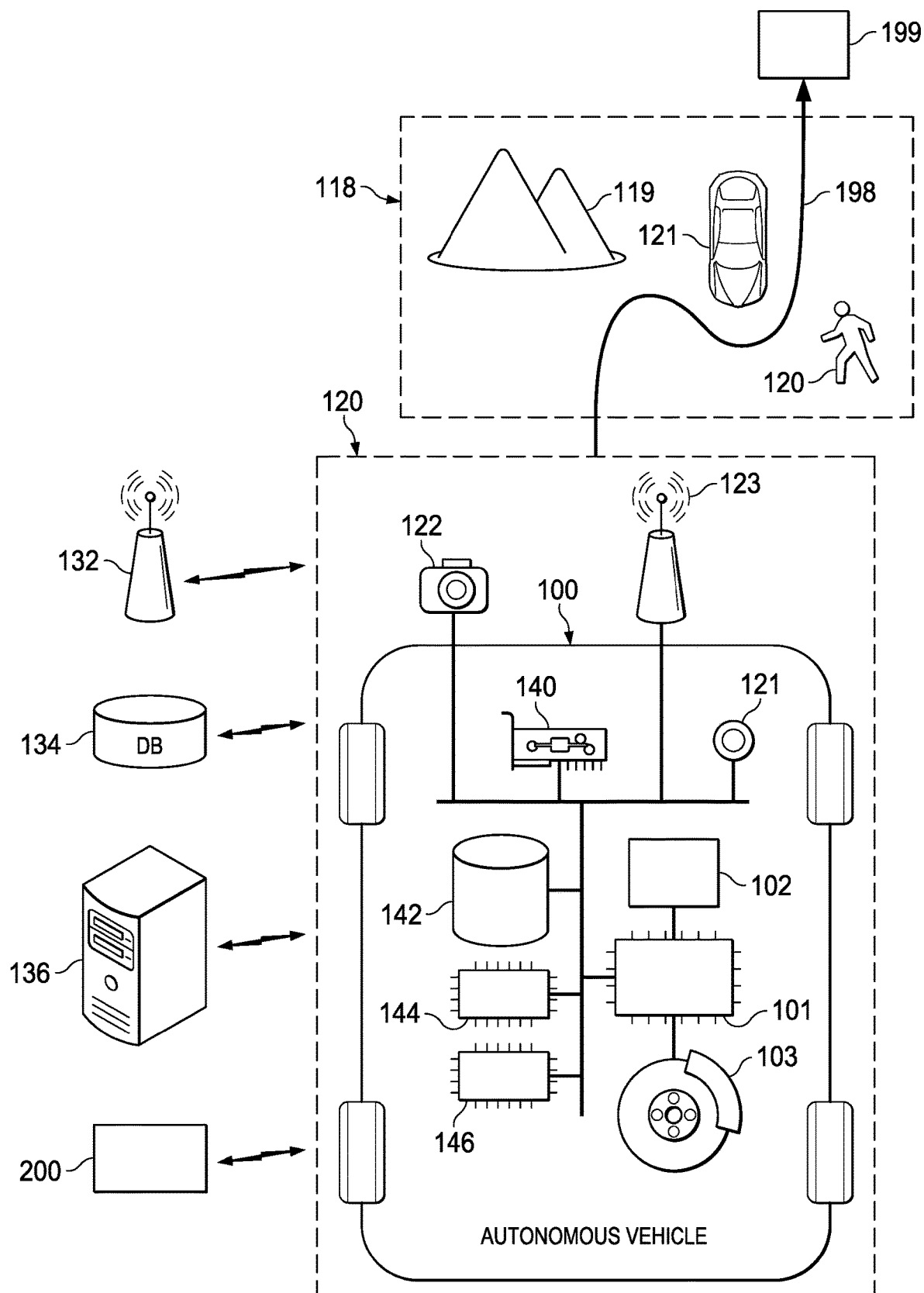
FIG. 1 shows an example of an autonomous vehicle having autonomous capability.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signals (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Control
6. Autonomous Vehicle Motion Graph Construction
7. Autonomous Vehicle Lane Level Route Planning General Overview This disclosure describes an autonomous vehicle that generates a lane graph, e.g., an abstract graph of paths, from a map of a geographic region to change lanes when traveling from an origin to a destination. Based on factors including pose, road blocks and type of lane dividers (e.g., lane markings), the autonomous vehicle can select the optimal path to change lanes. In some embodiments, the autonomous vehicle can determine multiple baseline nodes (described below) and, from the baseline nodes, determine baseline edges, each representing a transition between two baseline nodes. When generating a path to travel from one baseline node to another, the autonomous vehicle can use the nature of the divider (e.g., double yellow, dotted white) as a factor to decide viability of the path. In some embodiments, the autonomous vehicle can associate weights to the generated paths based on factors including viability of following a path and a cost to follow the path. The autonomous vehicle can identify an initial portion of a path (called a stem) and make a commitment to that stem such that future paths are determined from the tip (e.g., the end) of the stem.

System Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle. A lane is sometimes identified based on lane markings. For example, a lane may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area or, e.g., natural obstructions to be avoided in an undeveloped area. A lane could also be interpreted independent of lane markings or physical features. For example, a lane could be interpreted based on an arbitrary path free of obstructions in an area that otherwise lacks features that would be interpreted as lane boundaries. In an example scenario, an AV could interpret a lane through an obstruction-free portion of a field or empty lot. In another example scenario, an AV could interpret a lane through a wide (e.g., wide enough for two or more lanes) road that does not have lane markings. In this scenario, the AV could communicate information about the lane to other AVs so that the other AVs can use the same lane information to coordinate path planning among themselves.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV.

In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 204 described below in reference to FIG. 2. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 208 or storage device 210 described below in relation to FIG. 2. In an embodiment, memory 144 is similar to the main memory 206 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 212, input device 214, and cursor controller 216 discussed below in reference to FIG. 2. The coupling is wireless or wired. Any two or more of the interface devices may be integrated into a single device.

Figure 2:
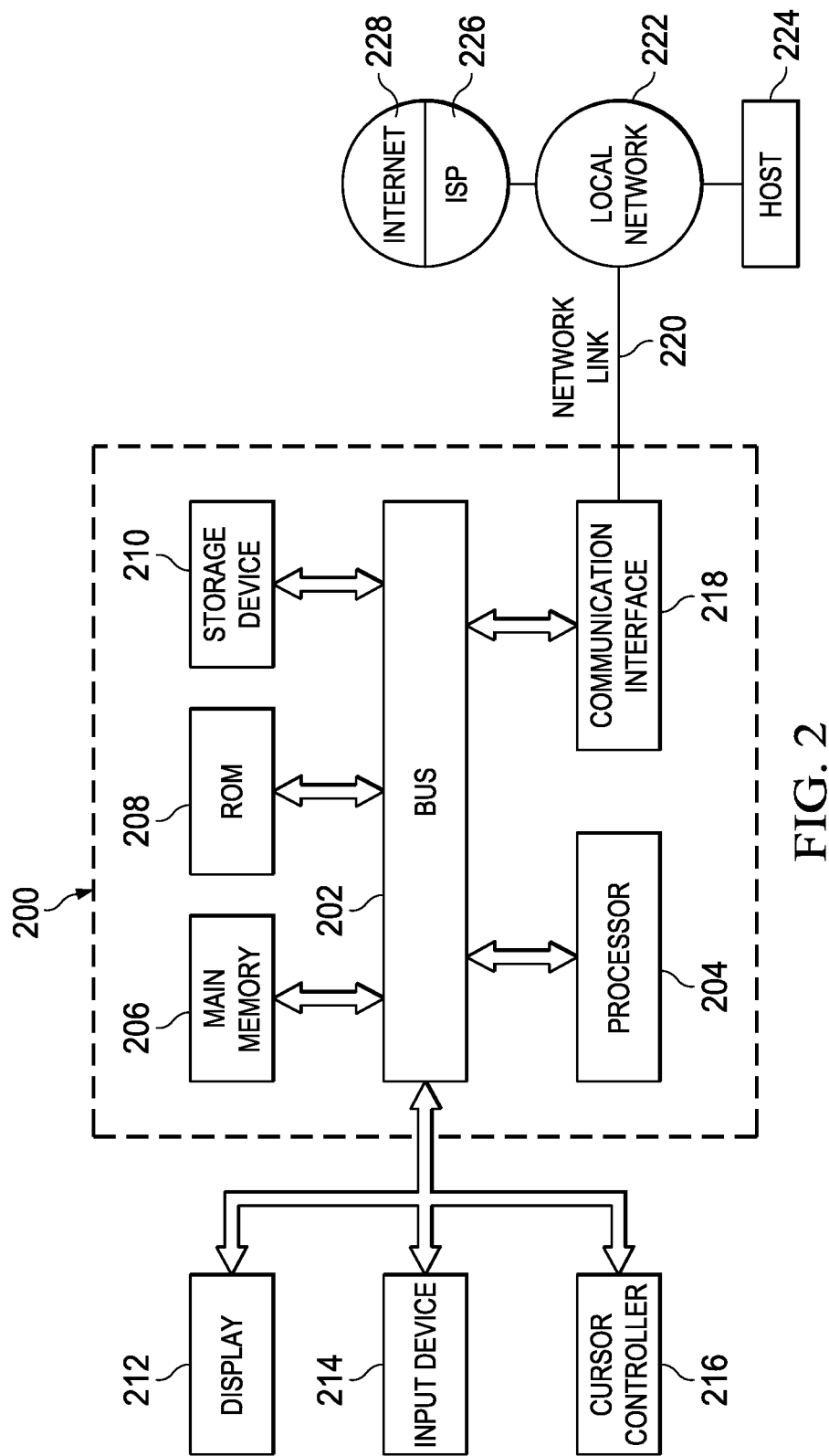
FIG. 2 illustrates a computer system.

FIG. 2 illustrates a computer system 200. In an implementation, the computer system 200 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 200 includes a bus 202 or other communication mechanism for communicating information, and a hardware processor 204 coupled with a bus 202 for processing information. The hardware processor 204 is, for example, a general-purpose microprocessor. The computer system 200 also includes a main memory 206, such as a random-access memory (RAM) or other dynamic storage device, coupled to the bus 202 for storing information and instructions to be executed by processor 204. In one implementation, the main memory 206 is used for storing temporary variables or other intermediate information during execution of instructions to be executed by the processor 204. Such instructions, when stored in non-transitory storage media accessible to the processor 204, render the computer system 200 into a special-purpose machine that is customized to perform the operations specified in the instructions.

In an embodiment, the computer system 200 further includes a read only memory (ROM) 208 or other static storage device coupled to the bus 202 for storing static information and instructions for the processor 204. A storage device 210, such as a magnetic disk, optical disk, solid-state drive, or three-dimensional cross point memory is provided and coupled to the bus 202 for storing information and instructions.

In an embodiment, the computer system 200 is coupled via the bus 202 to a display 212, such as a cathode ray tube (CRT), a liquid crystal display (LCD), plasma display, light emitting diode (LED) display, or an organic light emitting diode (OLED) display for displaying information to a computer user. An input device 214, including alphanumeric and other keys, is coupled to bus 202 for communicating information and command selections to the processor 204. Another type of user input device is a cursor controller 216, such as a mouse, a trackball, a touch-enabled display, or cursor direction keys for communicating direction information and command selections to the processor 204 and for controlling cursor movement on the display 212. This input device typically has two degrees of freedom in two axes, a first axis (e.g., x-axis) and a second axis (e.g., y-axis), that allows the device to specify positions in a plane.

According to one embodiment, the techniques herein are performed by the computer system 200 in response to the processor 204 executing one or more sequences of one or more instructions contained in the main memory 206. Such instructions are read into the main memory 206 from another storage medium, such as the storage device 210.

Execution of the sequences of instructions contained in the main memory 206 causes the processor 204 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 210. Volatile media includes dynamic memory, such as the main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 202. Transmission media can also take the form of acoustic or light waves, such as those generated during radio-wave and infrared data communications.

In an embodiment, various forms of media are involved in carrying one or more sequences of one or more instructions to the processor 204 for execution. For example, the instructions are initially carried on a magnetic disk or solid-state drive of a remote computer. The remote computer loads the instructions into its dynamic memory and send the instructions over a telephone line using a modem. A modem local to the computer system 200 receives the data on the telephone line and use an infrared transmitter to convert the data to an infrared signal. An infrared detector receives the data carried in the infrared signal and appropriate circuitry places the data on the bus 202. The bus 202 carries the data to the main memory 206, from which processor 204 retrieves and executes the instructions. The instructions received by the main memory 206 may optionally be stored on the storage device 210 either before or after execution by processor 204.

The computer system 200 also includes a communication interface 218 coupled to the bus 202. The communication interface 218 provides a two-way data communication coupling to a network link 220 that is connected to a local network 222. For example, the communication interface 218 is an integrated service digital network (ISDN) card, cable modem, satellite modem, or a modem to provide a data communication connection to a corresponding type of telephone line. As another example, the communication interface 218 is a local area network (LAN) card to provide a data communication connection to a compatible LAN. In some implementations, wireless links are also implemented. In any such implementation, the communication interface 218 sends and receives electrical, electromagnetic, or optical signals that carry digital data streams representing various types of information.

The network link 220 typically provides data communication through one or more networks to other data devices. For example, the network link 220 provides a connection through the local network 222 to a host computer 224 or to a cloud data center or equipment operated by an Internet Service Provider (ISP) 226. The ISP 226 in turn provides data communication services through the world-wide packet data communication network now commonly referred to as the "Internet" 228. The local network 222 and Internet 228 both use electrical, electromagnetic or optical signals that carry digital data streams. The signals through the various networks and the signals on the network link 220 and through the communication interface 218, which carry the digital data to and from the computer system 200, are example forms of transmission media. In an embodiment, the network 220 contains the cloud A202 or a part of the cloud A202 described above.

The computer system 200 sends messages and receives data, including program code, through the network(s), the network link 220, and the communication interface 218. In an embodiment, the computer system 200 receives code for processing. The received code is executed by the processor 204 as it is received, and/or stored in storage device 210, or other non-volatile storage for later execution.

Autonomous Vehicle Architecture

Figure 3:
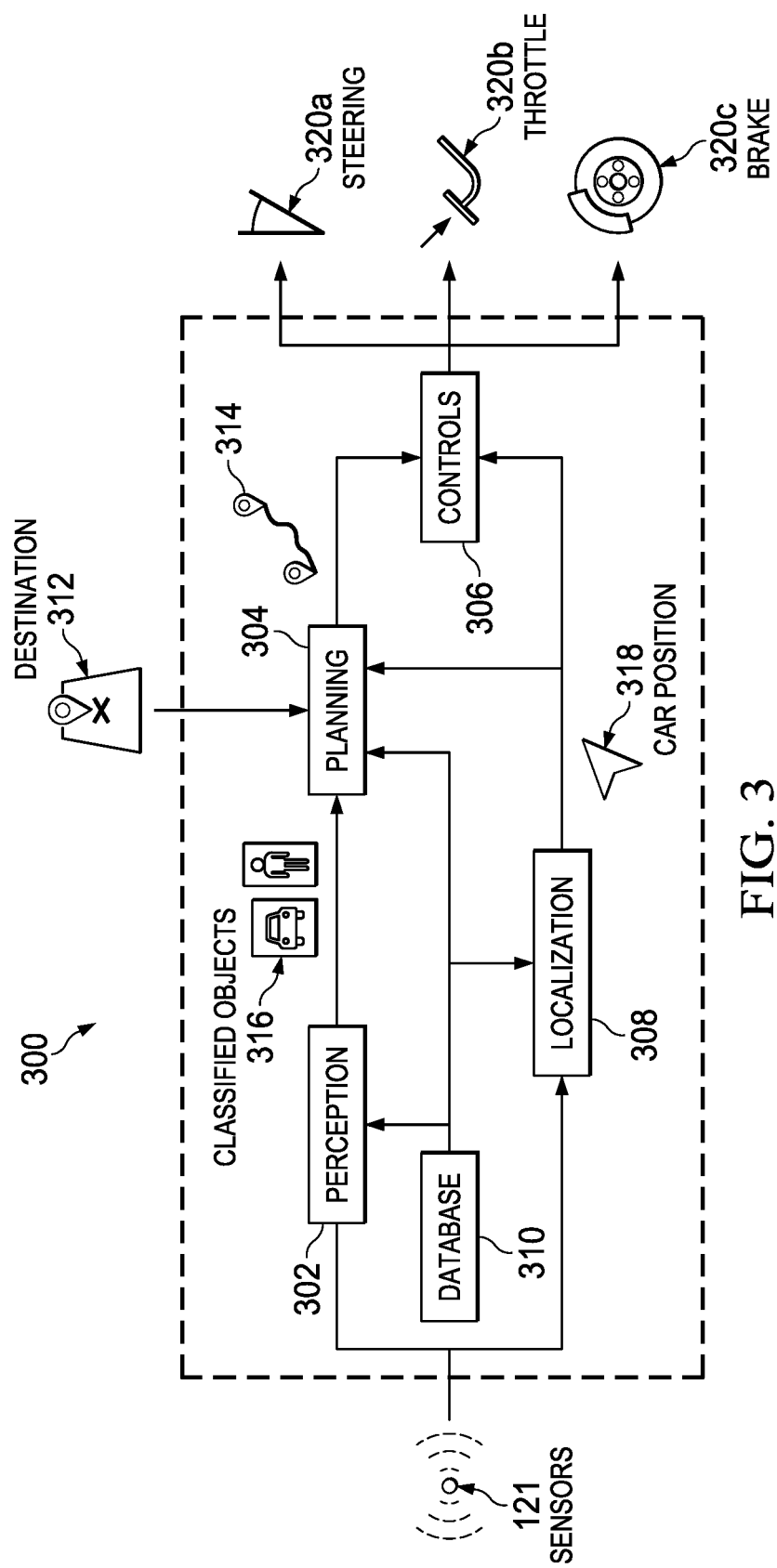
FIG. 3 shows an example architecture for an autonomous vehicle.

FIG. 3 shows an example architecture 300 for an autonomous vehicle (e.g., the AV 100 shown in FIG. 1). The architecture 300 includes a perception module 302 (sometimes referred to as a perception circuit), a planning module 304 (sometimes referred to as a planning circuit), a control module 306 (sometimes referred to as a control circuit), a localization module 308 (sometimes referred to as a localization circuit), and a database module 310 (sometimes referred to as a database circuit). Each module plays a role in the operation of the AV 100. Together, the modules 302, 304, 306, 308, and 310 may be part of the AV system 120 shown in FIG. 1. In some embodiments, any of the modules 302, 304, 306, 308, and 310 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 304 receives data representing a destination 312 and determines data representing a trajectory 314 (sometimes referred to as a route) that can be traveled by the AV 100 to reach (e.g., arrive at) the destination 312. In order for the planning module 304 to determine the data representing the trajectory 314, the planning module 304 receives data from the perception module 302, the localization module 308, and the database module 310.

The perception module 302 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 316 is provided to the planning module 304.

The planning module 304 also receives data representing the AV position 318 from the localization module 308. The localization module 308 determines the AV position by using data from the sensors 121 and data from the database module 310 (e.g., a geographic data) to calculate a position. For example, the localization module 308 uses data from a GNSS (Global Navigation Satellite System) sensor and geographic data to calculate a longitude and latitude of the AV. In an embodiment, data used by the localization module 308 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types. In an embodiment, the high-precision maps are constructed by adding data through automatic or manual annotation to low-precision maps.

The control module 306 receives the data representing the trajectory 314 and the data representing the AV position 318 and operates the control functions 320a-c (e.g., steering, throttling, braking, ignition) of the AV in a manner that will cause the AV 100 to travel the trajectory 314 to the destination 312. For example, if the trajectory 314 includes a left turn, the control module 306 will operate the control functions 320a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 4:
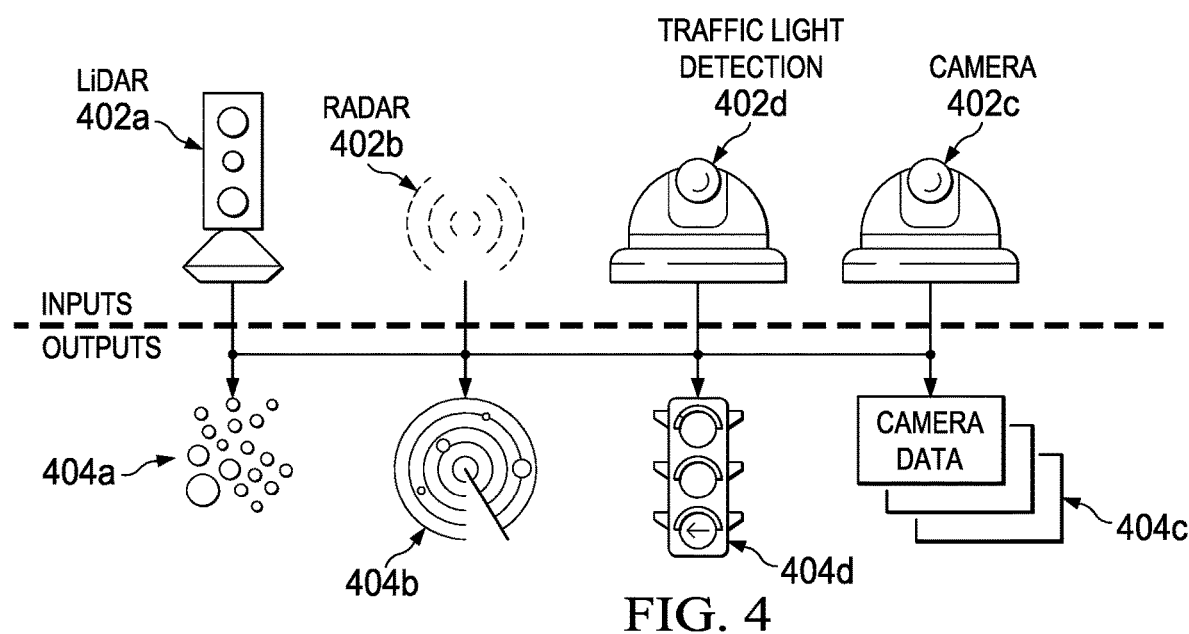
FIG. 4 shows an example of inputs and outputs that may be used by a perception module.

FIG. 4 shows an example of inputs 402a-d (e.g., sensors 121 shown in FIG. 1) and outputs 404a-d (e.g., sensor data) that is used by the perception module 302 (FIG. 3). One input 402a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 404a. For example, LiDAR data is collections of 3D or 2D points (also known as a point clouds) that are used to construct a representation of the environment 190.

Another input 402b is a RADAR system. RADAR is a technology that uses radio waves to obtain data about nearby physical objects. RADARs can obtain data about objects not within the line of sight of a LiDAR system. A RADAR system 402b produces RADAR data as output 404b. For example, RADAR data are one or more radio frequency electromagnetic signals that are used to construct a representation of the environment 190.

Another input 402c is a camera system. A camera system uses one or more cameras (e.g., digital cameras using a light sensor such as a charge-coupled device [CCD]) to obtain information about nearby physical objects. A camera system produces camera data as output 404c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 402d is a traffic light detection (TLD) system. A TLD system uses one or more cameras to obtain information about traffic lights, street signs, and other physical objects that provide visual navigation information. A TLD system produces TLD data as output 404d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 404a-d are combined using a sensor fusion technique. Thus, either the individual outputs 404a-d are provided to other systems of the AV 100 (e.g., provided to a planning module 304 as shown in FIG. 3), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Path Planning

Figure 5:
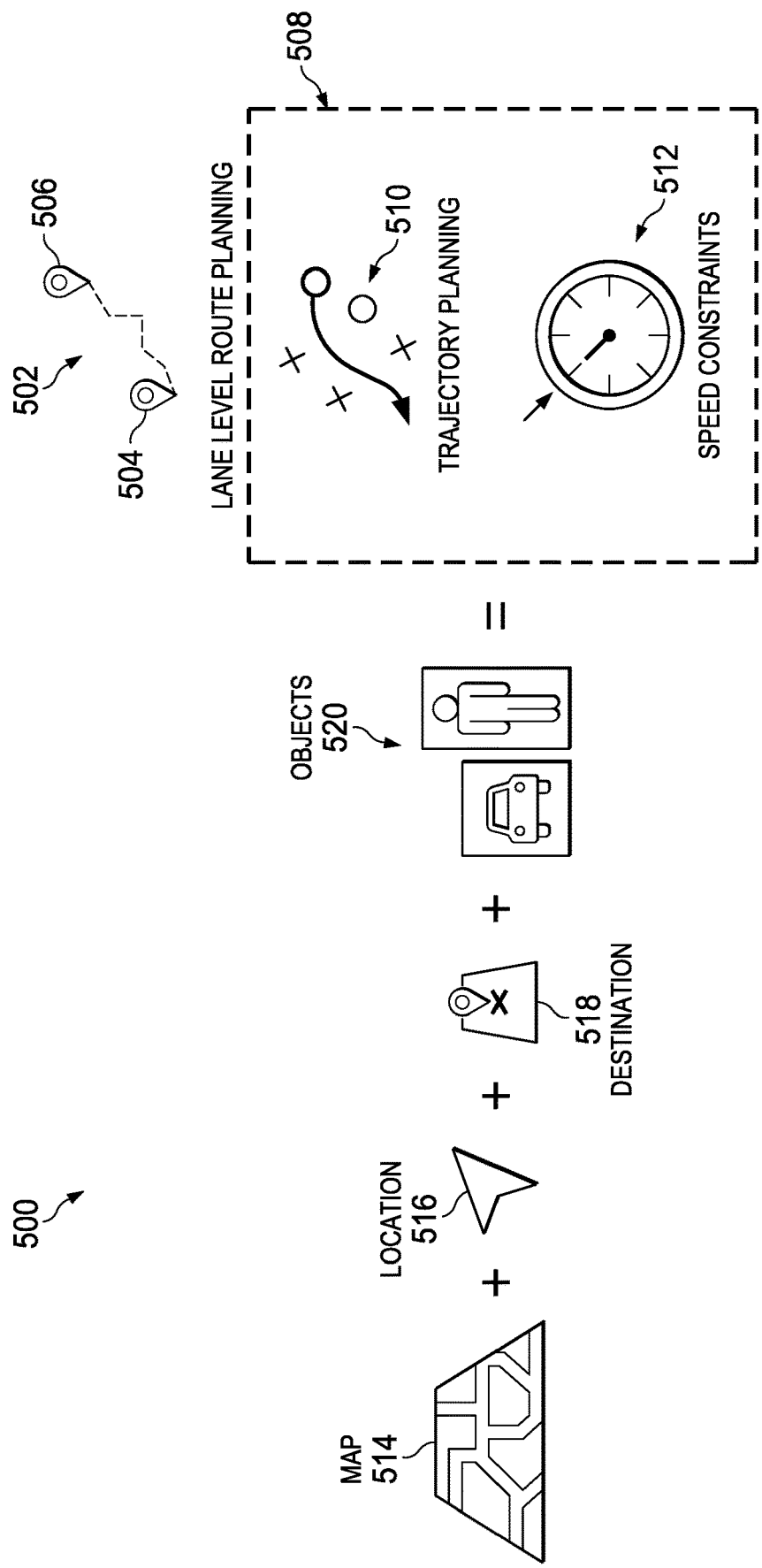
FIG. 5 shows a block diagram of the relationships between inputs and outputs of a planning module.

FIG. 5 shows a block diagram 500 of the relationships between inputs and outputs of a planning module 304 (e.g., as shown in FIG. 3). In general, the output of a planning module 304 is a route 502 from a start point 504 (e.g., source location or initial location), and an end point 506 (e.g., destination or final location). The route 502 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 502 includes "off-road" segments such as unpaved paths or open fields.

In addition to the route 502, a planning module also outputs lane-level route planning data 508. The lane-level route planning data 508 is used to traverse segments of the route 502 based on conditions of the segment at a particular time. For example, if the route 502 includes a multi-lane highway, the lane-level route planning data 508 includes trajectory planning data 510 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 508 includes speed constraints 512 specific to a segment of the route 502. For example, if the segment includes pedestrians or unexpected traffic, the speed constraints 512 may limit the AV 100 to a travel speed slower than an expected speed, e.g., a speed based on speed limit data for the segment.

In an embodiment, the inputs to the planning module 304 includes database data 514 (e.g., from the database module 310 shown in FIG. 3), current location data 516 (e.g., the AV position 318 shown in FIG. 3), destination data 518 (e.g., for the destination 312 shown in FIG. 3), and object data 520 (e.g., the classified objects 316 as perceived by the perception module 302 as shown in FIG. 3). In some embodiments, the database data 514 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 6:
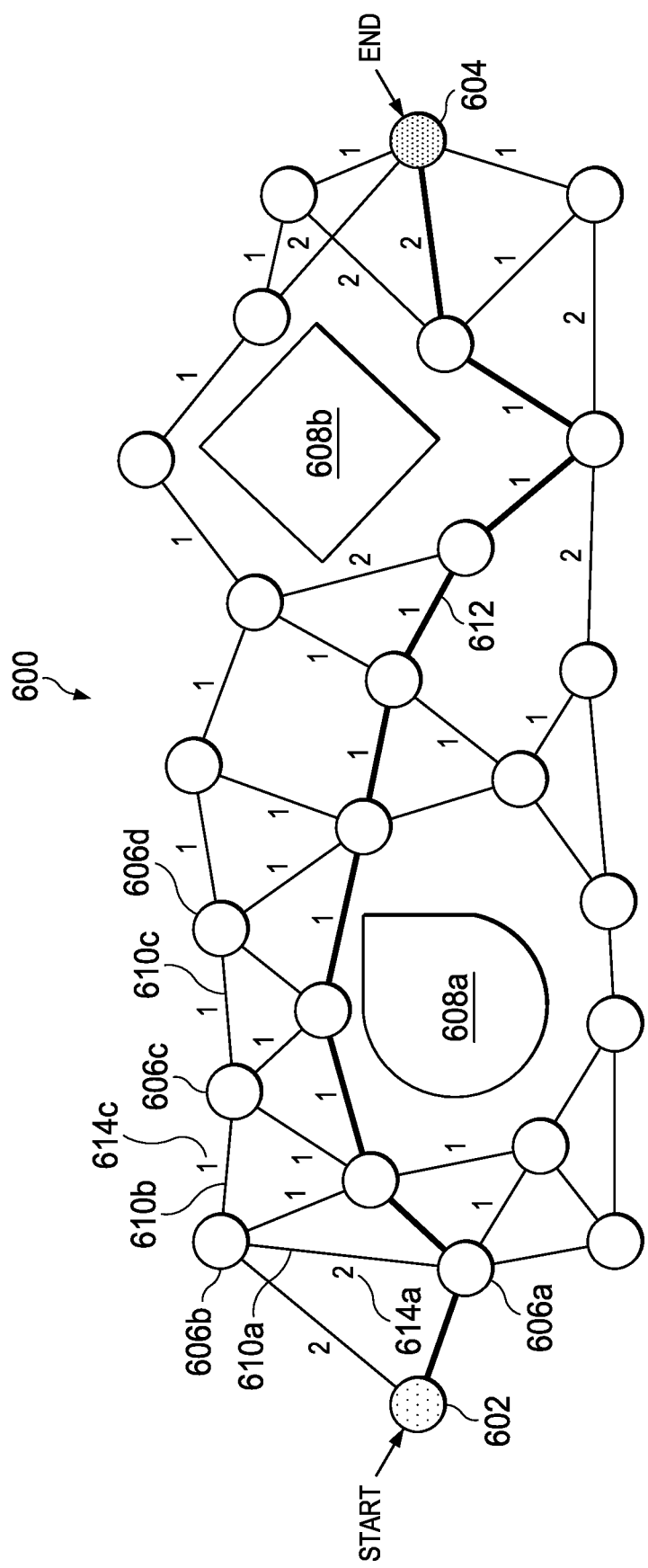
FIG. 6 shows a directed graph used in path planning.

FIG. 6 shows a directed graph 600 used in path planning, e.g., by the planning module 304 (FIG. 3). In general, a directed graph 600 like the one shown in FIG. 6 is used to determine a path between any start point 602 and end point 604. In real-world terms, the distance separating the start point 602 and end point 604 may be relatively large (e.g., in two different metropolitan areas) or may be relatively small (e.g., two intersections abutting a city block or two lanes of a multi-lane road).

In an embodiment, the directed graph 600 has nodes 606a-d representing different locations between the start point 602 and the end point 604 that could be occupied by an AV 100. In some examples, e.g., when the start point 602 and end point 604 represent different metropolitan areas, the nodes 606a-d represent segments of roads. In some examples, e.g., when the start point 602 and the end point 604 represent different locations on the same road, the nodes 606a-d represent different positions on that road. In this way, the directed graph 600 includes information at varying levels of granularity. In an embodiment, a directed graph having high granularity is also a subgraph of another directed graph having a larger scale. For example, a directed graph in which the start point 602 and the end point 604 are far away (e.g., many miles apart) has most of its information at a low granularity and is based on stored data, but also includes some high granularity information for the portion of the graph that represents physical locations in the field of view of the AV 100.

The nodes 606a-d are distinct from objects 608a-b which cannot overlap with a node. In an embodiment, when granularity is low, the objects 608a-b represent regions that cannot be traversed by automobile, e.g., areas that have no streets or roads. When granularity is high, the objects 608a-b represent physical objects in the field of view of the AV 100, e.g., other automobiles, pedestrians, or other entities with which the AV 100 cannot share physical space. In an embodiment, some or all of the objects 608a-b are a static objects (e.g., an object that does not change position such as a street lamp or utility pole) or dynamic objects (e.g., an object that is capable of changing position such as a pedestrian or other car).

The nodes 606a-d are connected by edges 610a-c. If two nodes 606a-b are connected by an edge 610a, it is possible for an AV 100 to travel between one node 606a and the other node 606b, e.g., without having to travel to an intermediate node before arriving at the other node 606b. (When we refer to an AV 100 traveling between nodes, we mean that the AV 100 travels between the two physical positions represented by the respective nodes.) The edges 610a-c are often bidirectional, in the sense that an AV 100 travels from a first node to a second node, or from the second node to the first node. In an embodiment, edges 610a-c are unidirectional, in the sense that an AV 100 can travel from a first node to a second node, however the AV 100 cannot travel from the second node to the first node. Edges 610a-c are unidirectional when they represent, for example, one-way streets, individual lanes of a street, road, or highway, or other features that can only be traversed in one direction due to legal or physical constraints.

In an embodiment, the planning module 304 uses the directed graph 600 to identify a path 612 made up of nodes and edges between the start point 602 and end point 604.

An edge 610a-c has an associated cost 614a-b. The cost 614a-b is a value that represents the resources that will be consumed if the AV 100 chooses that edge. A typical resource is time. For example, if one edge 610a represents a physical distance that is twice that as another edge 610b, then the associated cost 614a of the first edge 610a may be twice the associated cost 614b of the second edge 610b. Other factors that affect time include expected traffic, number of intersections, speed limit, etc. Another typical resource is fuel economy. Two edges 610a-b may represent the same physical distance, but one edge 610a may require more fuel than another edge 610b, e.g., because of road conditions, expected weather, etc.

When the planning module 304 identifies a path 612 between the start point 602 and end point 604, the planning module 304 typically chooses a path optimized for cost, e.g., the path that has the least total cost when the individual costs of the edges are added together.

Autonomous Vehicle Control

Figure 7:
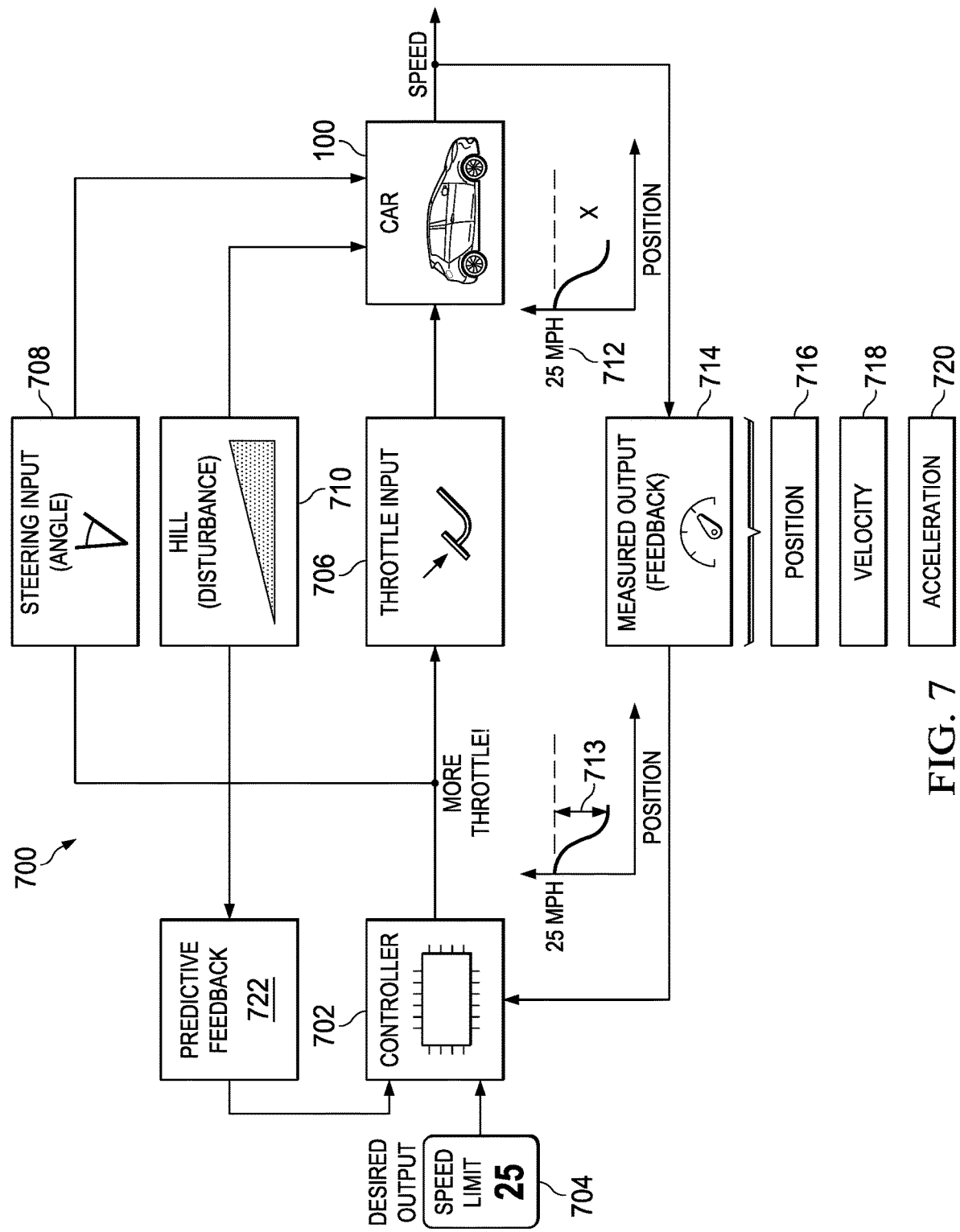
FIG. 7 shows a block diagram of the inputs and outputs of a control module.

FIG. 7 shows a block diagram 700 of the inputs and outputs of a control module 306 (e.g., as shown in FIG. 3). A control module operates in accordance with a controller 702 which includes, for example, one or more processors (e.g., one or more computer processors such as microprocessors or microcontrollers or both) similar to processor 204, short-term and/or long-term data storage (e.g., memory random-access memory or flash memory or both) similar to main memory 206, ROM 1308, and storage device 210, and instructions stored in memory that carry out operations of the controller 702 when the instructions are executed (e.g., by the one or more processors).

In an embodiment, the controller 702 receives data representing a desired output 704. The desired output 704 typically includes a velocity, e.g., a speed and a heading. The desired output 704 can be based on, for example, data received from a planning module 304 (e.g., as shown in FIG. 3). In accordance with the desired output 704, the controller 702 produces data usable as a throttle input 706 and a steering input 708. The throttle input 706 represents the magnitude in which to engage the throttle (e.g., acceleration control) of an AV 100, e.g., by engaging the steering pedal, or engaging another throttle control, to achieve the desired output 704. In some examples, the throttle input 706 also includes data usable to engage the brake (e.g., deceleration control) of the AV 100. The steering input 708 represents a steering angle, e.g., the angle at which the steering control (e.g., steering wheel, steering angle actuator, or other functionality for controlling steering angle) of the AV should be positioned to achieve the desired output 704.

In an embodiment, the controller 702 receives feedback that is used in adjusting the inputs provided to the throttle and steering. For example, if the AV 100 encounters a disturbance 710, such as a hill, the measured speed 712 of the AV 100 is lowered below the desired output speed. In an embodiment, any measured output 714 is provided to the controller 702 so that the necessary adjustments are performed, e.g., based on the differential 713 between the measured speed and desired output. The measured output 714 includes measured position 716, measured velocity 718, (including speed and heading), measured acceleration 720, and other outputs measurable by sensors of the AV 100.

In an embodiment, information about the disturbance 710 is detected in advance, e.g., by a sensor such as a camera or LiDAR sensor, and provided to a predictive feedback module 722. The predictive feedback module 722 then provides information to the controller 702 that the controller 702 can use to adjust accordingly. For example, if the sensors of the AV 100 detect ("see") a hill, this information can be used by the controller 702 to prepare to engage the throttle at the appropriate time to avoid significant deceleration.

Figure 8:
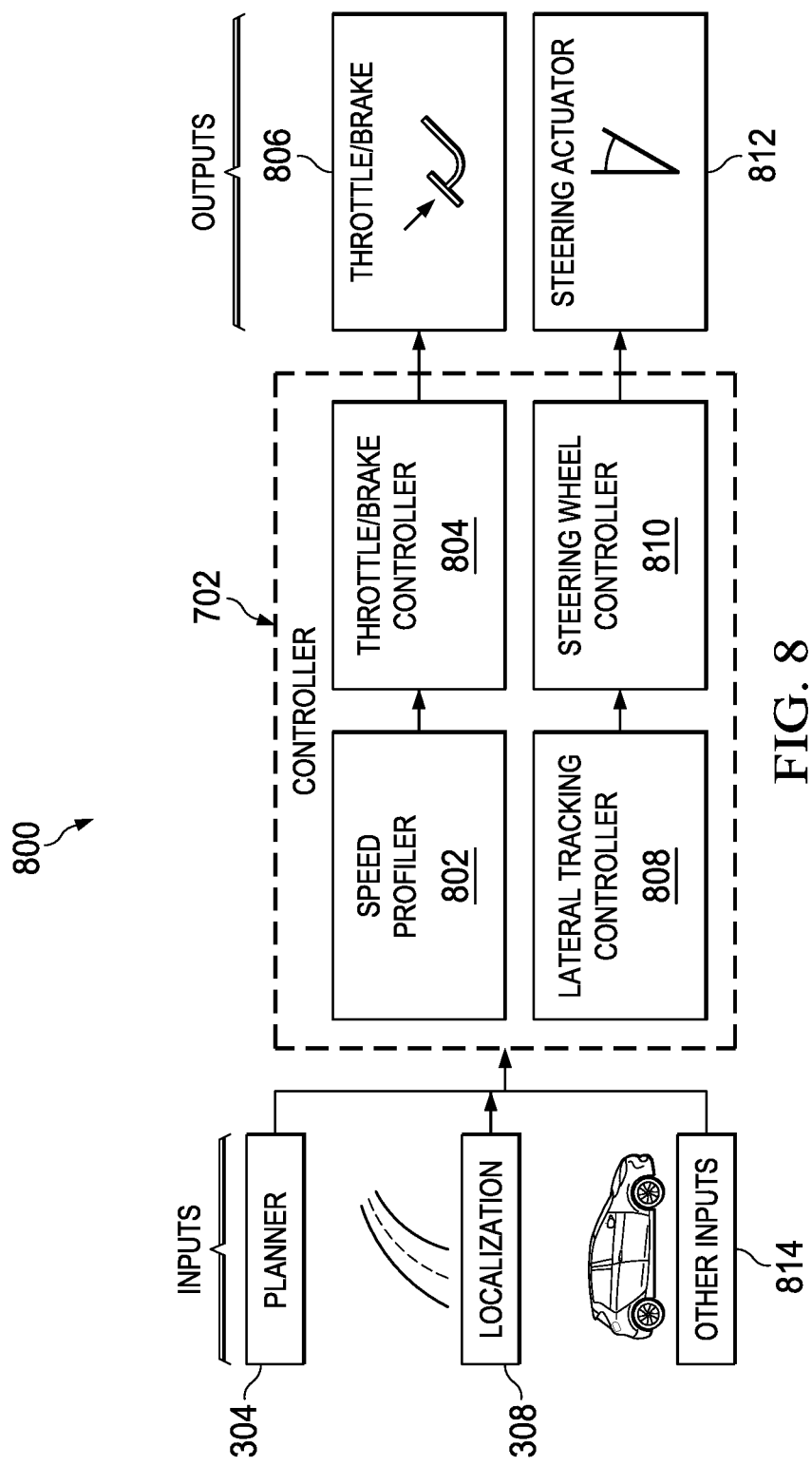
FIG. 8 shows a block diagram of the inputs, outputs, and components of a controller.

FIG. 8 shows a block diagram 800 of the inputs, outputs, and components of the controller 702. The controller 702 has a speed profiler 802 which affects the operation of a throttle/brake controller 804. For example, the speed profiler 802 instructs the throttle/brake controller 804 to engage acceleration or engage deceleration using the throttle/brake 806 depending on, e.g., feedback received by the controller 702 and processed by the speed profiler 802.

The controller 702 also has a lateral tracking controller 808 which affects the operation of a steering controller 810. For example, the lateral tracking controller 808 instructs the steering controller 804 to adjust the position of the steering angle actuator 812 depending on, e.g., feedback received by the controller 702 and processed by the lateral tracking controller 808.

The controller 702 receives several inputs used to determine how to control the throttle/brake 806 and steering angle actuator 812. A planning module 304 provides information used by the controller 702, for example, to choose a heading when the AV 100 begins operation and to determine which road segment to traverse when the AV 100 reaches an intersection. A localization module 308 provides information to the controller 702 describing the current location of the AV 100, for example, so that the controller 702 can determine if the AV 100 is at a location expected based on the manner in which the throttle/brake 806 and steering angle actuator 812 are being controlled. In an embodiment, the controller 702 receives information from other inputs 814, e.g., information received from databases, computer networks, etc.

Autonomous Vehicle Motion Graph Construction

This section describes computer-implemented methods executed by the AV system 120, for example, by the planning module 304, to plan lane-level routes (sometimes called paths or trajectories) on which the AV 100 can travel. The paths are physical, real-world paths in a geographic region. To plan the routes, the planning module 304 represents and stores the geographic region as a map that includes map elements. The following paragraphs describe various map elements. Certain map elements have direct correspondence to physical, real world elements (e.g., lanes, intersections) while other map elements are conceptual and implemented as computer constructs generated and used by the planning module 304 to plan routes.

Figure 9:
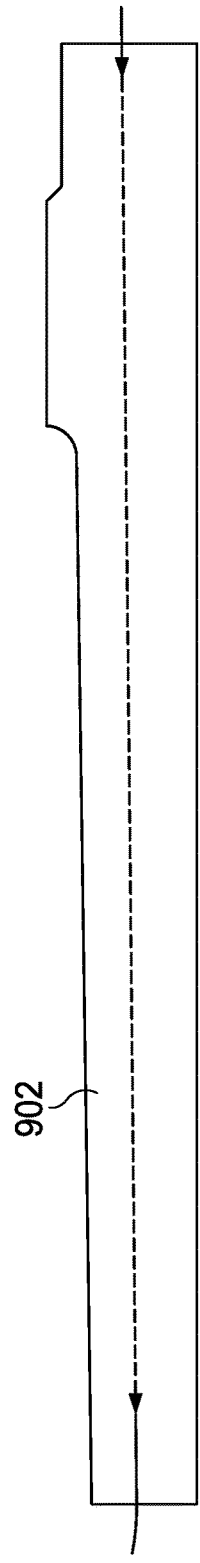
FIG. 9 shows a schematic diagram of a lane.

FIG. 9 shows a schematic diagram of a lane 902. A lane 902 is a physical lane on a road and is associated with a direction and a polygon representing its geometrical extent on a geographic map. Two lanes are connected longitudinally via lane connectors (described below). The lane 902 is associated with a road block (described below). Two adjacent lanes associated with the same direction are separated by a lane divider (e.g., a lane marking). Lane dividers can have different types, for example, single solid white, single dashed white, double solid white, double dashed white, single zigzag white, and single solid yellow, left dashed white right solid white. In an embodiment, these lane divider types are assigned to the lane dividers during the process of constructing the high-precision maps as described above. Lane dividers without explicit annotation are treated as NIL type, i.e., a type indicating that the lane divider is not classified as any of the other lane divider types. A subset of the land dividers, for example, the NIL, single solid white and single dashed white, are considered lane changeable, e.g., the autonomous vehicle can legally cross over the lane divider from one lane to the adjacent lane. A lane is associated with exactly one baseline sequence (described below).

Figure 10:
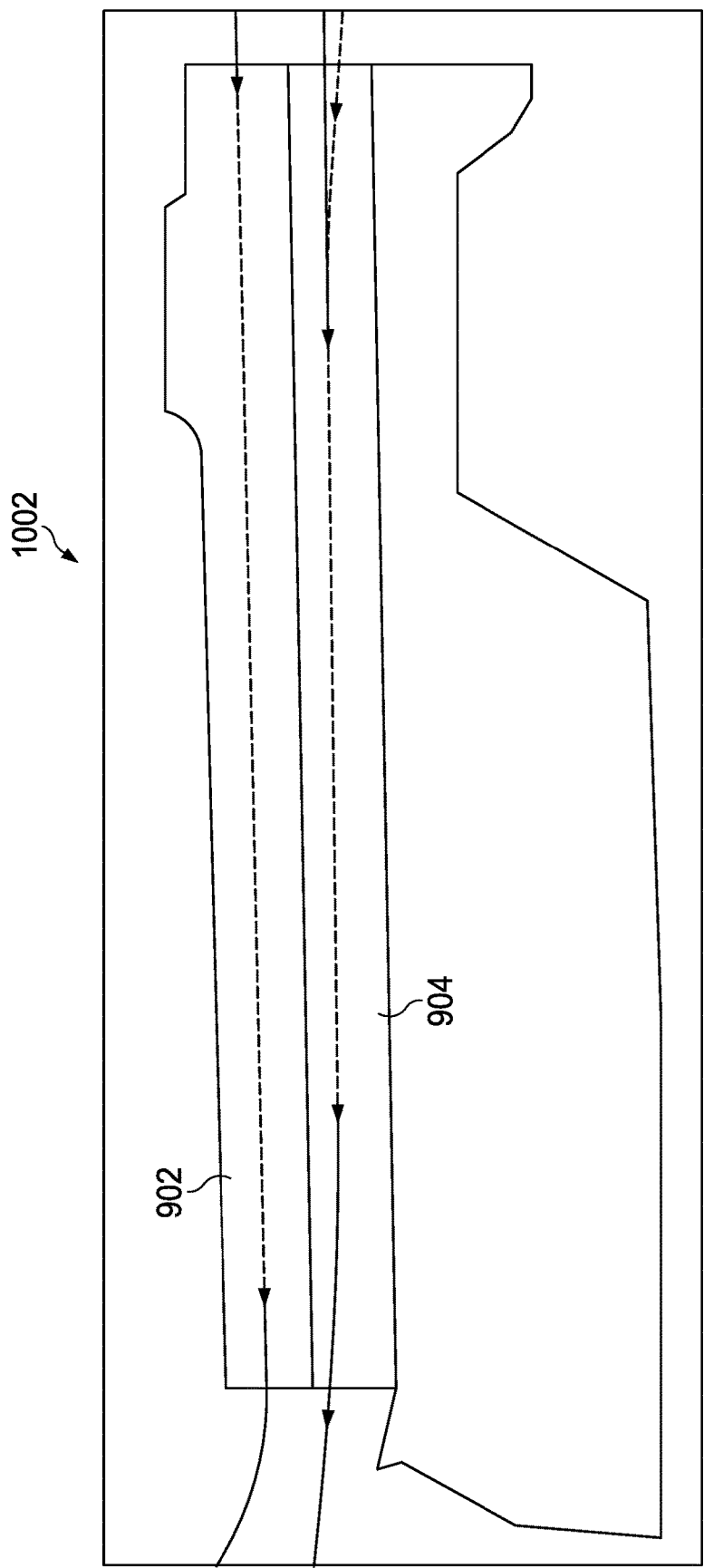
FIG. 10 shows a schematic diagram of a road block containing two lanes.

FIG. 10 shows a schematic diagram of a road block 1002 containing two lanes 902 and 904. A road block is a portion of a physical drivable region in the environment. A road block has multiple lanes. The road block 1002 contains multiple lanes traveling in the same directions. Lanes in the same road block are indexed in the lateral direction. A road block is longitudinally connected to other road blocks by road block connectors. A road block connector is associated with an intersection and can include one or many lane connectors.

Figure 11:
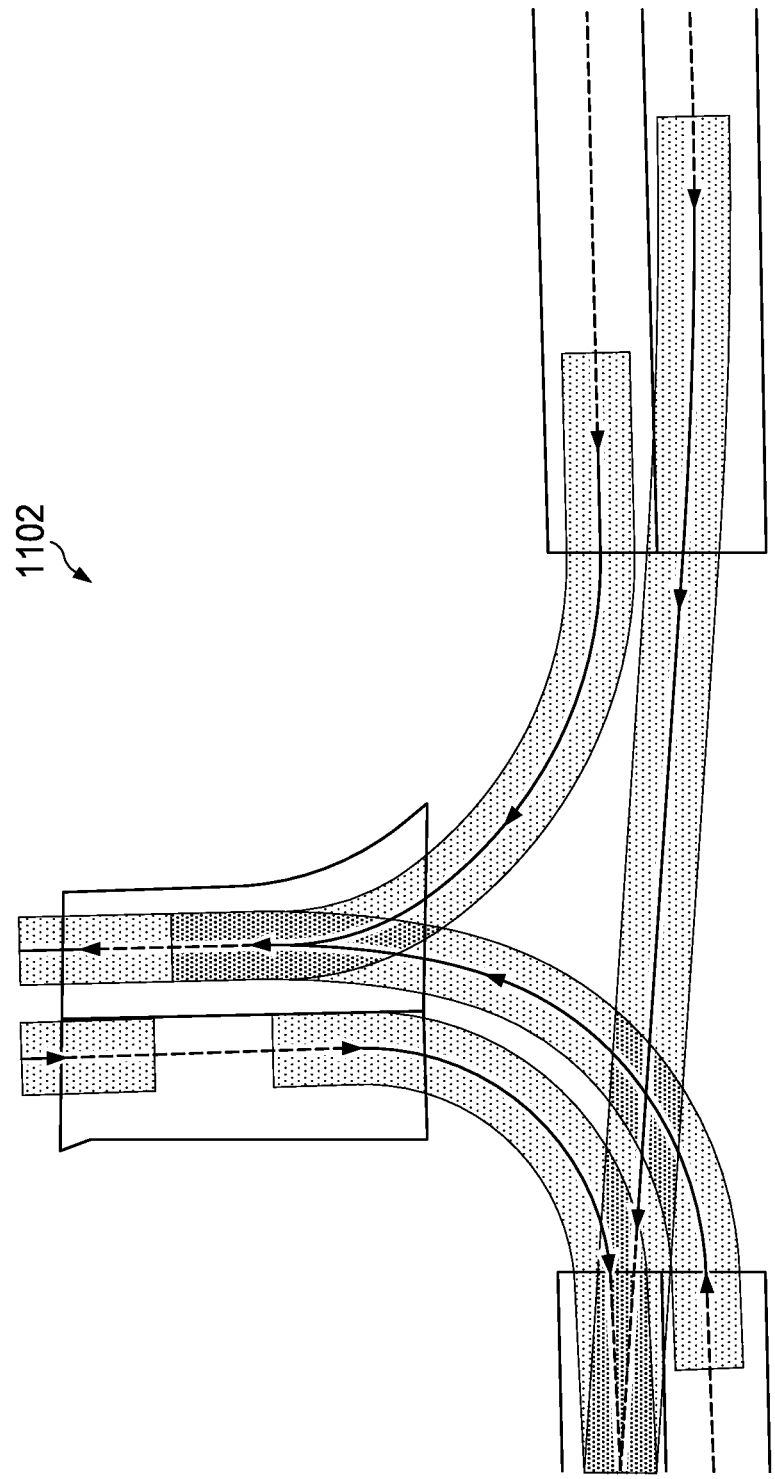
FIG. 11 shows a schematic diagram of a lane connector.

FIG. 11 shows a schematic diagram of a lane connector 1102. A lane connector longitudinally connects the end of a lane to the start of another lane. A lane connector is associated with a polygon representing its geometrical extent on a geographic map. A lane connector is associated with a road block connector and with a baseline sequence. In the lane connector 1102 shown in FIG. 11, the shaded regions represent lane connecting polygons, each including an associated baseline.

Figure 12:
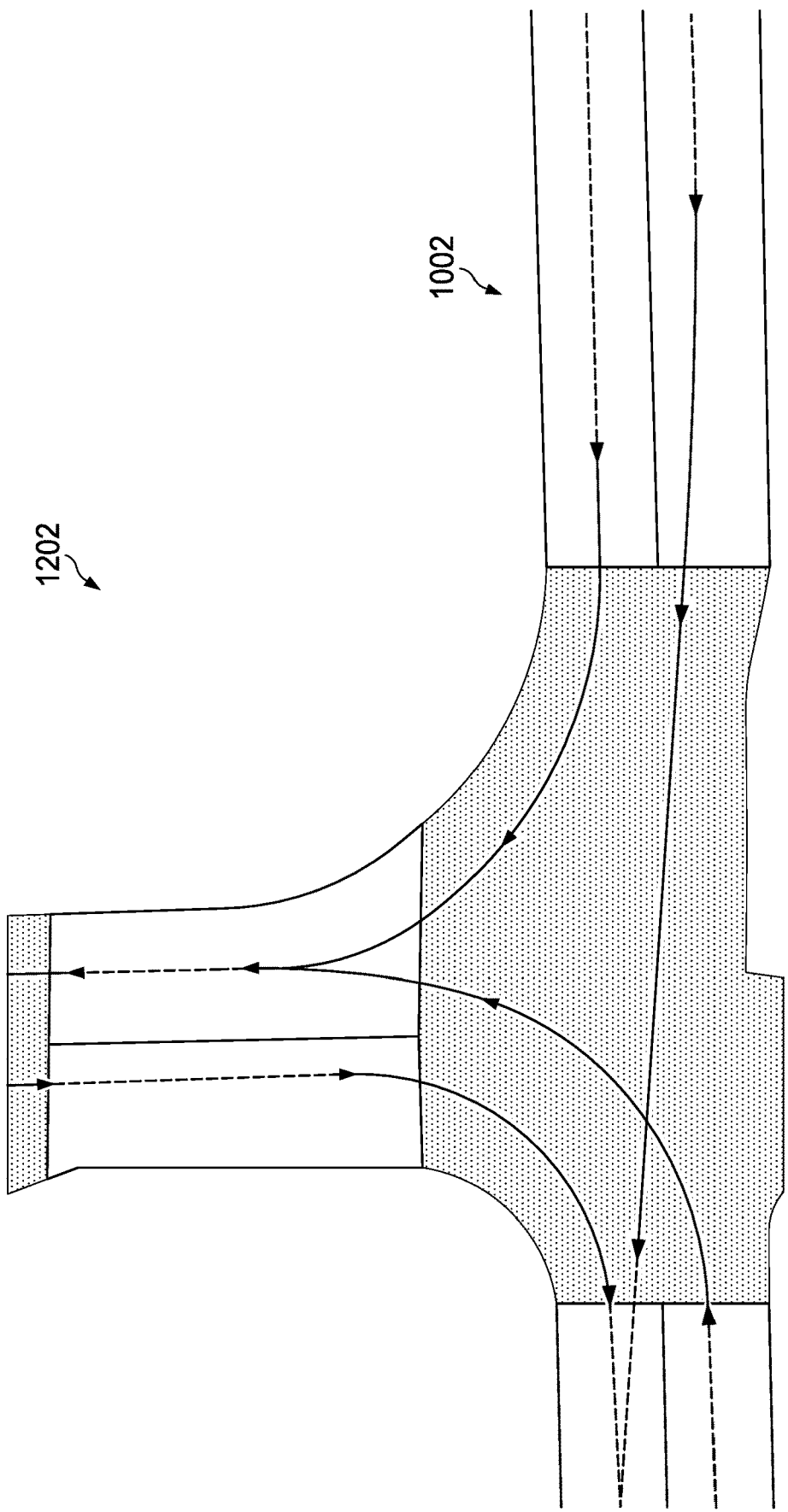
FIG. 12 shows a schematic diagram of an intersection.

FIG. 12 shows a schematic diagram of an intersection 1202. An intersection is associated with a polygon representing its geometrical extent on the map. The intersection 1202 includes multiple road blocks, e.g., road block 1002.

Figure 13:
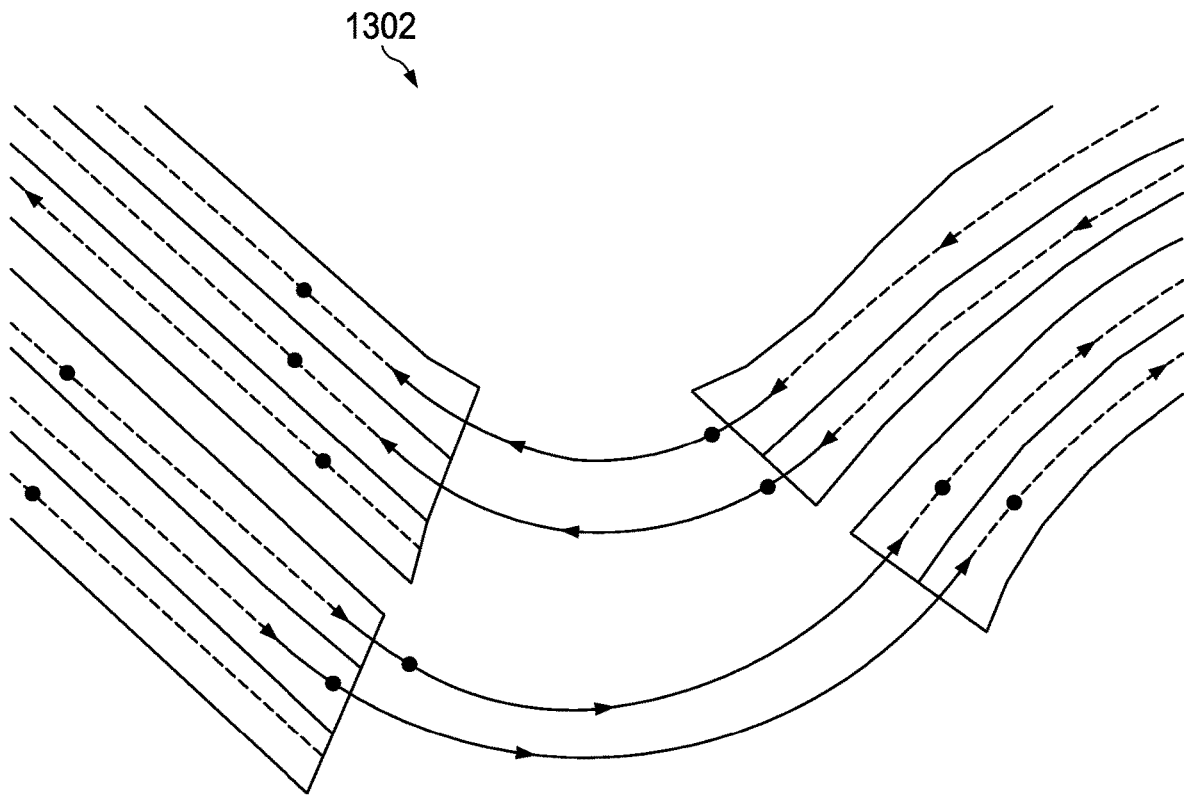
FIG. 13 shows a schematic diagram of a baseline sequence.

FIG. 13 shows a schematic diagram of a baseline sequence 1302. The baseline sequence is associated with lanes and lane connectors, and can contain more than one baseline edge. A baseline edge represents a transition, e.g., a Dubins transition, between two baseline nodes. (A Dubins transition is a transition along a Dubins path, which is the shortest curve between two points that adheres to a constraint. The constraint is typically determined based on the turning radius of a vehicle.) A baseline edge is associated with two baseline nodes—an origin node and a destination node. A baseline node represents a pose, e.g., a vector representing a speed and a direction. A baseline node is associated with zero or one or many incoming and outgoing baseline edges.

Figure 14:
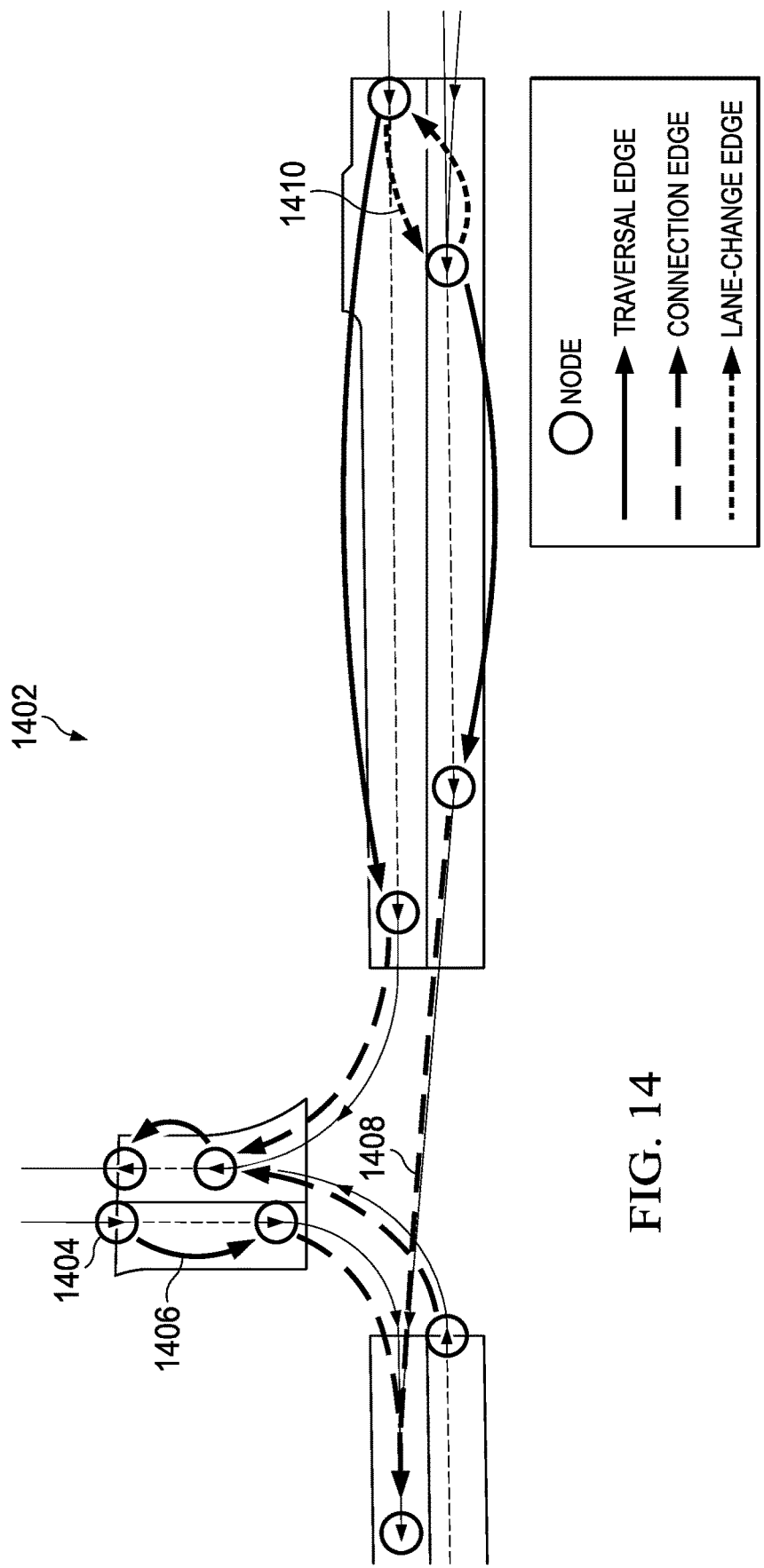
FIG. 14 is a schematic diagram of a lane graph.

FIG. 14 is a schematic diagram of a lane graph 1402. The lane graph is an abstraction of the lane-level road network used for lane-level route planning. The lane graph is a directional graph that includes lane graph nodes (e.g., lane graph node 1404) and lane graph edges including one or more traversal edges (e.g., traversal edge 1406), one or more connection edges (e.g., connection edge 1408) and one or more lane change edges (e.g., lane change edges 1410). A lane graph node, e.g., lane graph node 1404, is either a lane-starting node or a lane-ending node. A lane-starting node corresponds to the starting point (e.g., a baseline node) of a lane and a lane-ending node corresponds to the ending point (e.g., a baseline node) of a lane. A lane graph node is associated with one lane. A lane-starting node is always connected to exactly one lane-ending node of the same lane via a traversal edge. A lane-ending node could connect to one or many or no lane-starting nodes of other lanes via respective one or many or no lane-connection edges.

A lane graph edge (e.g., lane graph edge 1406, 1408 or 1410) connects from exactly one origin lane graph node to exactly one destination lane graph node. A lane edge has a lane graph cost (described below). A traversal edge (e.g., the traversal edge 1406) always connects from a lane-starting node to a lane-ending node). A connection edge (e.g., the connection edge 1408) always connects from the lane-ending node of the incoming lane to the lane-starting node of the outgoing lane. A lane change edge (e.g., the lane change edge 1410) always connects from a lane-starting node to a different lane-starting node in the same road block. Each of the traversal edge and the connection edge is associated with exactly one baseline sequence, but the lane change edge is not.

In an embodiment, the planning module 304 uses one or more or all of the map elements described above to construct multiple routes for the AV 100 to traverse within a geographic region. The origin (e.g., a first location in space at a particular time, sometimes referred to as a spatiotemporal location) and destination (e.g., a second spatiotemporal location) of the AV 100 lie within the geographic region. The planning module 304 accesses a map of the geographic region which can be stored, for example, in the database module 310 or received from a different computer-readable storage medium that stores the map. The map includes information identifying at least one lane on which vehicles can travel in the geographic region.

In some implementations, the planning module 304 generates, from the map, a graph representing a driving environment of the AV 100. The graph of the driving environment of the AV 100 represents a smaller geographic area compared to the map of the geographic region. For example, the graph of the driving environment of the AV 100 can include the present spatiotemporal location of the AV 100 and surrounding areas. In particular, the graph can exclude representations of other geographic areas. That is, if the geographic area covered by each graph of the driving environment were positioned adjacent to each other, the map of the geographic region would result. In some implementations, the planning module 304 is configured to generate the graph of the driving environment as the AV 100 travels from one smaller geographic area to the next, e.g., adjacent, smaller geographic area. By doing so, resources of the planning module 304, e.g., memory, processing resources, are conserved and the operational speed of the planning module 304 is increased.

The graph of the driving environment of the AV 100 includes more driving details about the smaller geographic area compared to driving details about the entire geographic area covered by the map of the geographic region. For example, the map of the entire geographic area can include high level map elements such as lanes only. In contrast, the graph of the driving environment can include all of the map elements, described above, that can be generated for the smaller geographic area represented by the graph. In some implementations, the planning module 304 can identify the smaller geographic area to be covered by the graph based, in part, on the location of the AV 100 in the smaller geographic area and generate all the map elements described above for the smaller geographic area.

Autonomous Vehicle Lane Level Route Planning

Having generated the graph of the driving environment, the planning module 304 can generate trajectories, each of which is a path on which the AV 100 can travel. To do so, in some implementations, the planning module 304 identifies a first lane within the geographic area represented by the driving environment. Within the first lane, the planning module 304 can identify a starting node representing a starting spatiotemporal location and an ending node representing an ending spatiotemporal location. The planning module 304 can generate an edge from the starting node to the ending node. The edge represents the trajectory between the starting spatiotemporal location and the ending spatiotemporal location. For example, the edge can lie within the first lane and not cross-over to an adjacent lane.

In an embodiment, the planning module 304 identifies a second lane within the geographic area. The planning module 304 can generate an edge from the ending node to a node representing a spatiotemporal location in the second lane. The edge can represent a trajectory crossing the first lane to the second lane. The edge from the ending node to the node representing the spatiotemporal location in the second lane can include a transition based on factors affecting the traveling of the AV 100 from the ending node to the spatiotemporal location in the second lane. The factors can include, for example, a shortest distance between the two nodes, a shortest time to travel between the two nodes, speed constraints to travel in either lane, driving conditions in the driving environment, or any combination of two or more of them. Each factor can be determined using one or more techniques described earlier.

In this manner, the planning module 304 can generate multiple edges, each connecting two nodes, and each edge being a traversal edge, a connection edge or a lane change edge. Having generated the edges, the planning module 304 can generate multiple baseline sequences, each connecting at least two edges. The planning module 304 can assign and store a unique identifier for each baseline sequence. The start and end nodes of all the edges lie within the smaller geographic area covered by the graph of the driving environment in which the AV 100 is positioned at the time that the AV 100 generates the graph.

As the AV 100 approaches the boundary of the geographic area represented by the graph, the planning module 304 can identify the adjacent geographic area and generate the graph of the driving environment in the adjacent geographic area. In this manner, the planning module 304 can generate graphs of driving environments of adjacent geographic areas in real-time. By real-time, it is meant that a time between receiving input to performing an action, e.g., generating a graph of a driving environment, and performing the action is negligible, e.g., of the order of seconds, micro-seconds or nano-seconds. In some implementations, the planning module 304 can generate graphs of driving environments of multiple geographic areas, each adjacent to (e.g., adjoining or near) the geographic area in which the AV 100 is present.

The AV 100 evaluates a cost when traversing a lane graph edge. Certain examples of assigning costs to traversing edges are described below. Other assignments of costs are possible. The cost depends on the path length, e.g., length of the baseline sequence that the AV travels (path length cost), and maneuver, e.g., the number of lane-changes (maneuver cost). Traversing a traversal edge (e.g., the traversal edge 1406) or a connection edge (e.g., the connection edge 1408) is assigned a zero-maneuver cost. Traversing a lane change edge (e.g., the lane change edge 1410) is assigned a maneuver cost equal to one. Lane change edges are assigned path length costs according to the following rule. If a lane change connects from a shorter lane to a longer lane (measured in path length), then the path length cost of the lane change is zero. If a lane change connects from a longer lane to a shorter lane (measured in path length), then the path length cost of the lane change edge is set to the difference between the path length of the longer lane and the shorter lane. Such an assignment avoids the bias toward lane changing to shorter lanes to avoid shorter lanes. The cost of a sequence of lane graph edges is the sum of the costs of each edge.

The current cost is defined to be a weighted sum of the path length cost and the maneuver cost. In some implementations, the weight is a pre-determined value selected based on a comparison of a cost for a one-lane change with respect to traveling additional distance. For example, given Route A that has a one lane change and Route B that has no lane change, if traveling on Route B will incur an additional travel distance equal to the pre-determined value (for example, 30 meters), then Route A will be selected. In other words, a one lane change is too costly if doing so will save less than the pre-determined value in travel distance. A lane route is a sequence of connected lane graph edges. The starting node of a route is a lane starting node when the first edge is a lane traversal edge. The starting node of a route is a lane ending node when the first edge is a lane connection edge. The ending node of a route is a lane ending node when the last edge is a lane traversal edge. The ending node of a route is a lane starting node when the last edge is a lane connection edge.

In an embodiment, the cost depends upon a lane-change penalty cost in addition to the path length cost and maneuver cost. The lane-change penalty cost is described as the difference between the length of longest lane in the map and the shorter of the length of the starting and ending lane of the lane-change edge divided by the difference between the length of the longest lane in the map and the length of the shortest lane in the map. The motivation for introducing the lane-change penalty cost is to discourage lane changes on shorter road blocks. This is because lane changing at shorter road blocks often results in a sharper and more abrupt maneuvers. In an embodiment, the lane-change penalty cost is always between 0.0 and 1.0 (and is conceptually in the same unit as a maneuver cost). In an embodiment, the lane change cost parameters are defined such that cost of changing lanes when the vehicle is traversing the shortest road block (for example 1 maneuver cost+1 lane-change penalty cost) in the map is twice the cost of changing lanes when the vehicle is traversing the longest road block (1 maneuver cost+0 lane-change penalty cost).

Having constructed the multiple routes, the planning module 304 identifies a route with the least cost from a lane starting node to a lane ending node using a depth first search algorithm starting from the goal, e.g., the final destination of the AV 100. The route is a sequence of connected lane graph edges. Starting node of a route is a lane starting node when the first edge is a lane traversal edge. Starting node of a route is a lane ending node when the first edge is a lane connection edge. Ending node of a route is a lane ending node when the last edge is a lane traversal edge. Ending node of a route is a lane starting node when the last edge is a lane connection edge. The planning module 304 terminates the depth first search upon determining that every lane node that's backward reachable from the goal has the correct cost-to-go. On this basis, the planning module 304 extracts the shortest path from the starting node to ending node of the graph. The route is a path for the AV 100 to autonomously move from a first spatiotemporal location to a second spatiotemporal location. At least one of the routes includes at least one lane along which the AV 100 can move.

Figure 15:
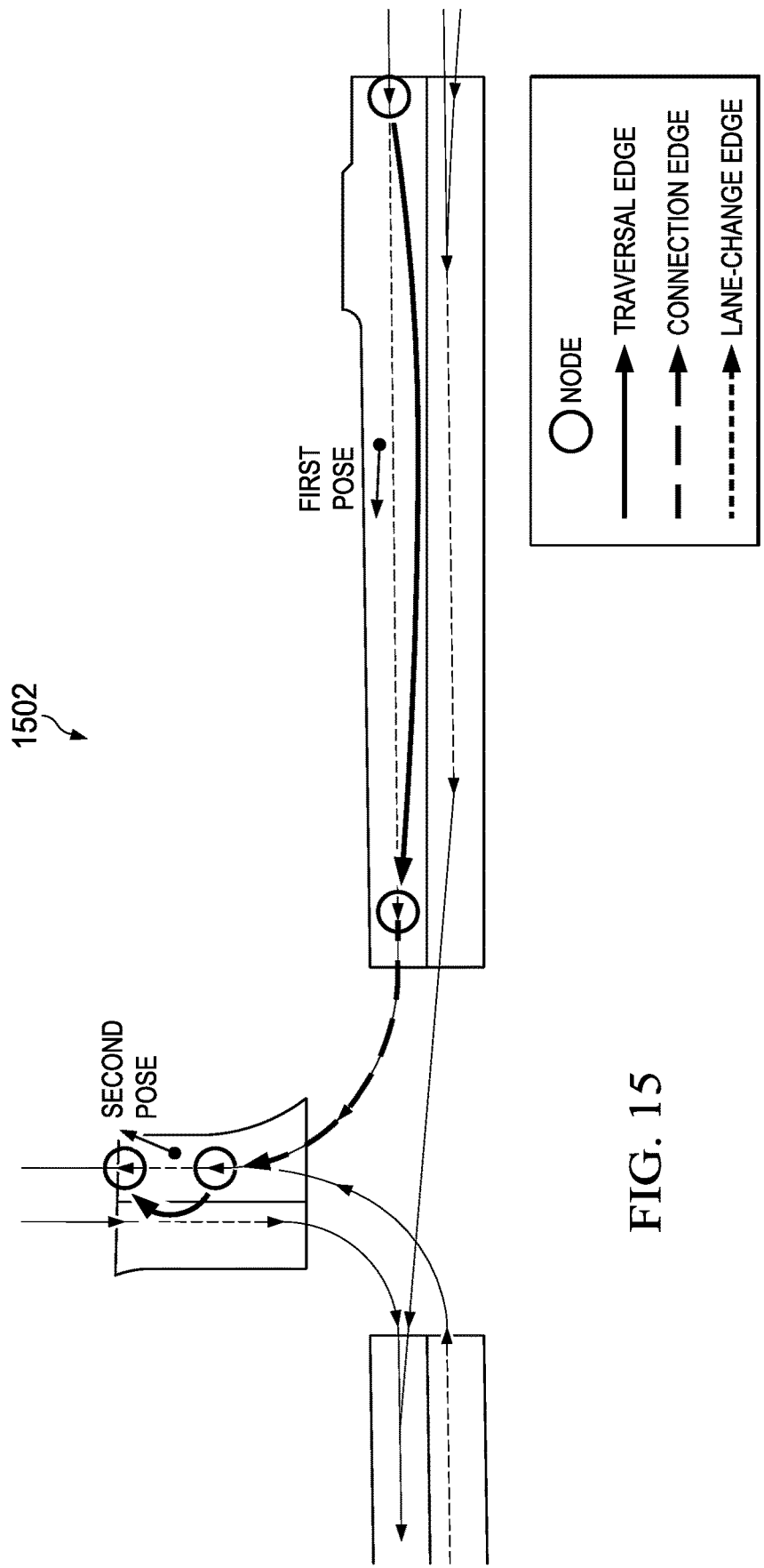
FIG. 15 is a schematic diagram of a first example of a trajectory on which the autonomous vehicle can travel.

FIG. 15 is a schematic diagram of a first example of a trajectory 1502 on which the AV can travel. An example of processes that can be implemented by the planning module 304 to generate the trajectory 1502 are described here. The planning module 304 determines the pose, e.g., the speed and direction, of the AV 100. The planning module 304 projects the pose to the closest baseline edge on the baseline graph with the distance defined as the lateral distance between the pose and the projected pose. The projected pose is a future speed and direction in which the AV 100 will travel. In doing so, the planning module 304 implements the following exception. If the heading difference between the pose and the projected pose is larger than a threshold angle, e.g., 45°, then the planning module 304 considers the distance to be infinity. If the coordinate of the projected pose lies within a lane polygon, then the planning module 304 determines the corresponding traversal edge as the corresponding lane graph edge. Because lane polygons do not overlap, there exists either no lane or exactly one lane.

If the coordinate of the projected pose does not lie within a lane polygon but is within one or more lane connector polygons, then the planning module 304 associates the pose with the lane graph edge that is closest to the pose. In such instances, the planning module 304 defines the distance to be lateral distance between the pose and its projection on the lane-connector with the following exception. If the projection of the pose onto the baseline sequence lies outside of the baseline sequence (longitudinally), the planning module 304 considers the projection to have a distance of infinity. If the heading difference between the pose and its projection onto the baseline sequence is larger than a threshold angle, e.g., 90°, the planning module 304 considers the projection to have a distance of infinity. If the projected pose is not within any lane or lane connector polygon, the planning module 304 ignores the pose.

Figure 16:
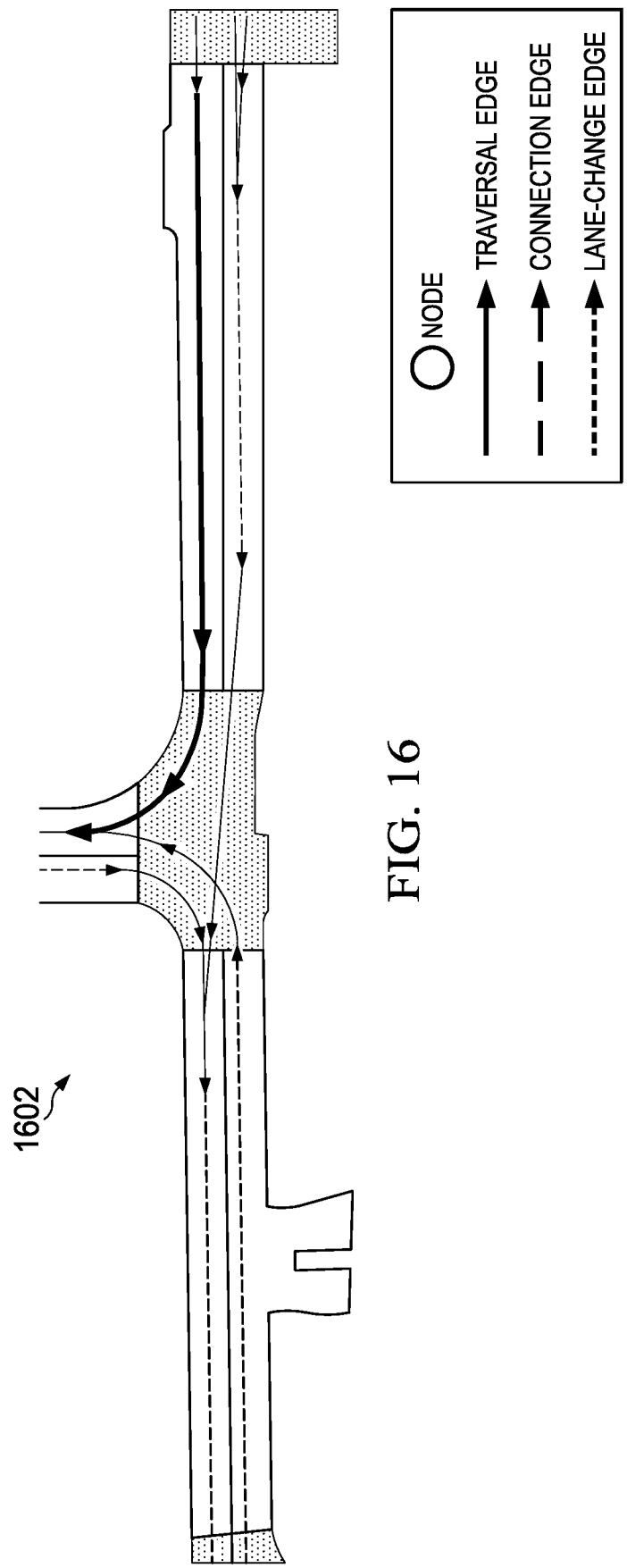
FIG. 16 is a schematic diagram of a first example of a baseline associated with the first example of the trajectory.
Figure 17:
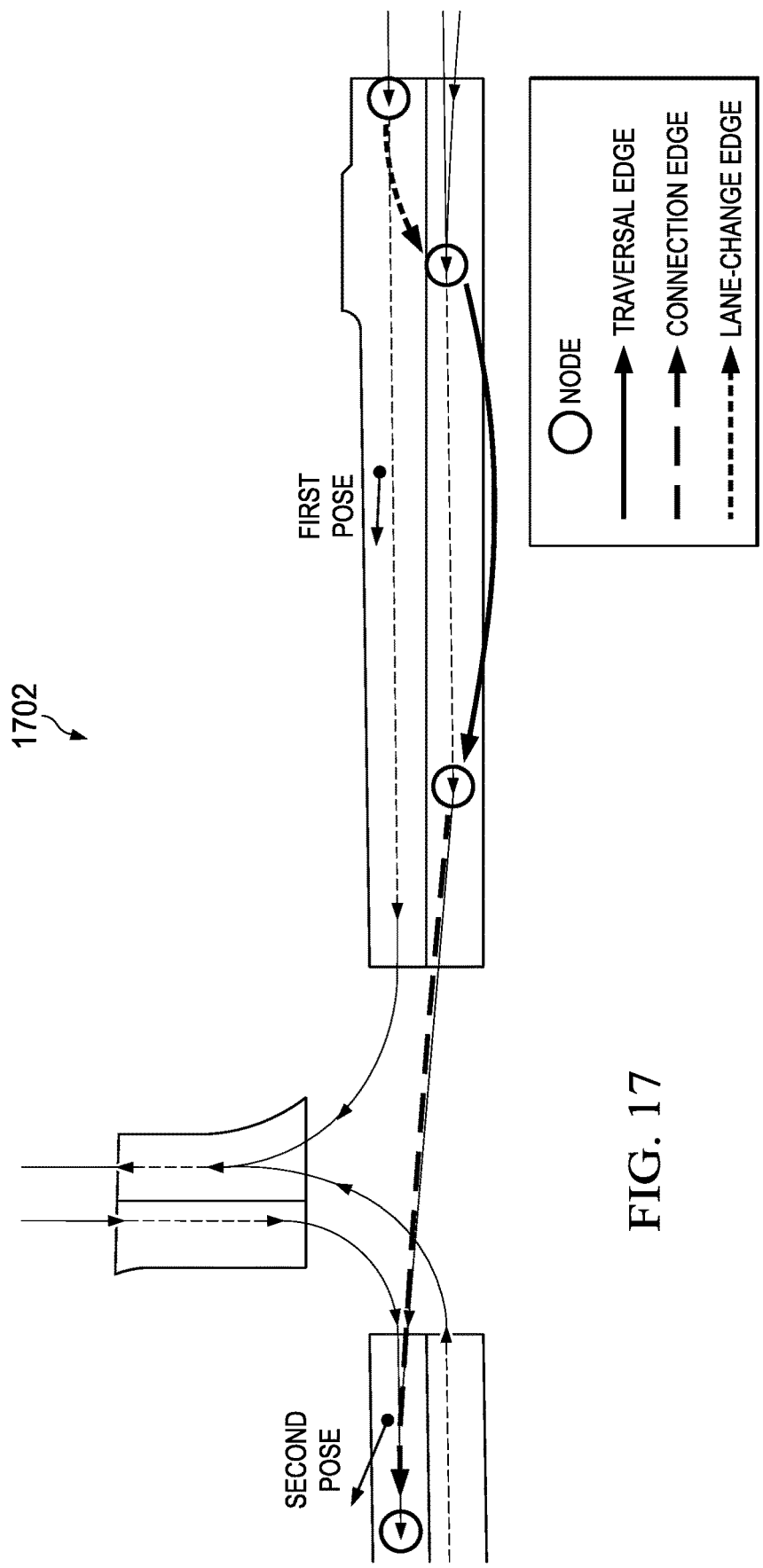
FIG. 17 is a schematic diagram of a second example of a trajectory on which the autonomous vehicle can travel.
Figure 18:
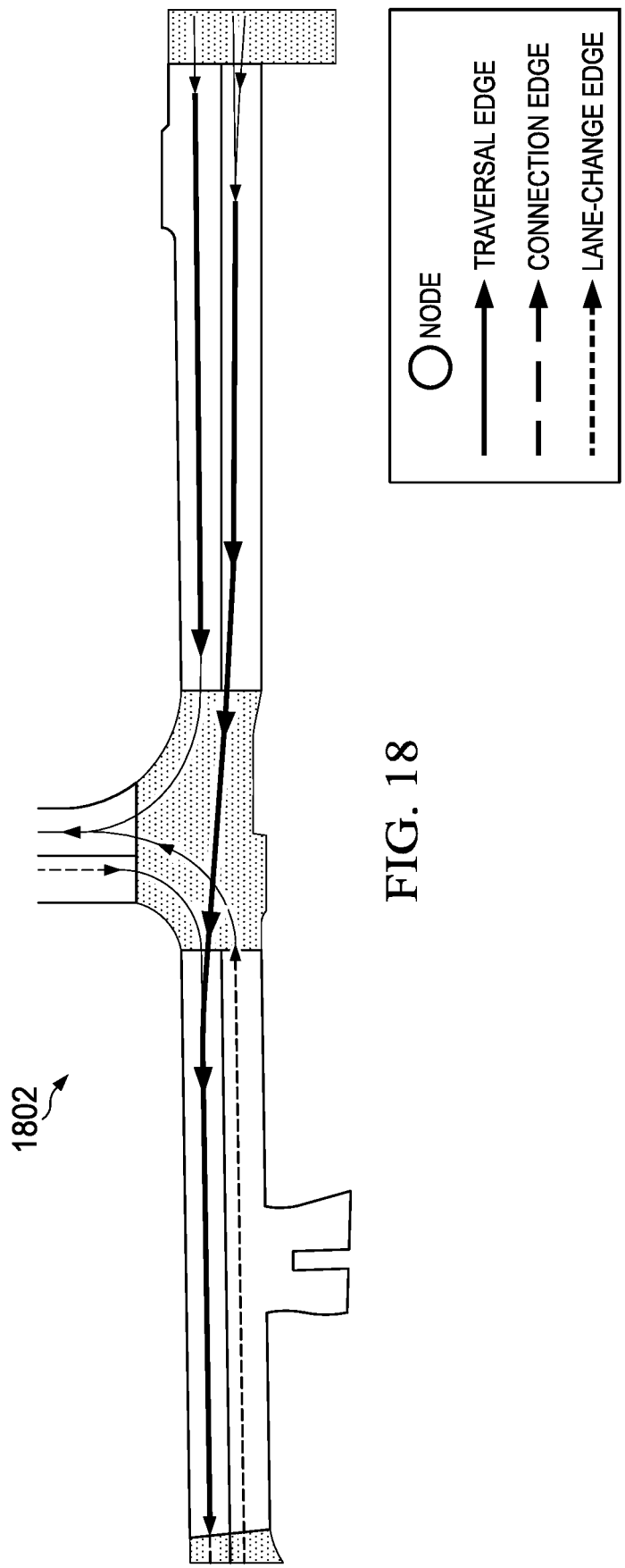
FIG. 18 is a schematic diagram of a second example of a baseline associated with the second example of the trajectory.

Upon determining the corresponding lane graph edge of a pose, the planning module 304 determines the corresponding lane graph node by implementing the following processes. If the pose corresponds to the beginning of a route (for example, the current pose of the AV 100 when planning the route), then the planning module 304 uses the origin node of the lane graph edge. If, on the other hand, the pose corresponds to the end of a route (for example, the destination location), then the planning module 304 uses the destination node of the lane graph edge. The resulting route or trajectory, e.g., trajectory 1502, includes a traversal edge, a connection edge and a lane change edge. FIG. 16 is a schematic diagram of a first example of a baseline 1602 associated with the trajectory 1502. FIG. 17 is a schematic diagram of a second example of a trajectory 1702 on which the AV 100 can travel. FIG. 18 is a schematic diagram of a second example of a baseline 1802 associated with the trajectory 1702.

Figure 19:
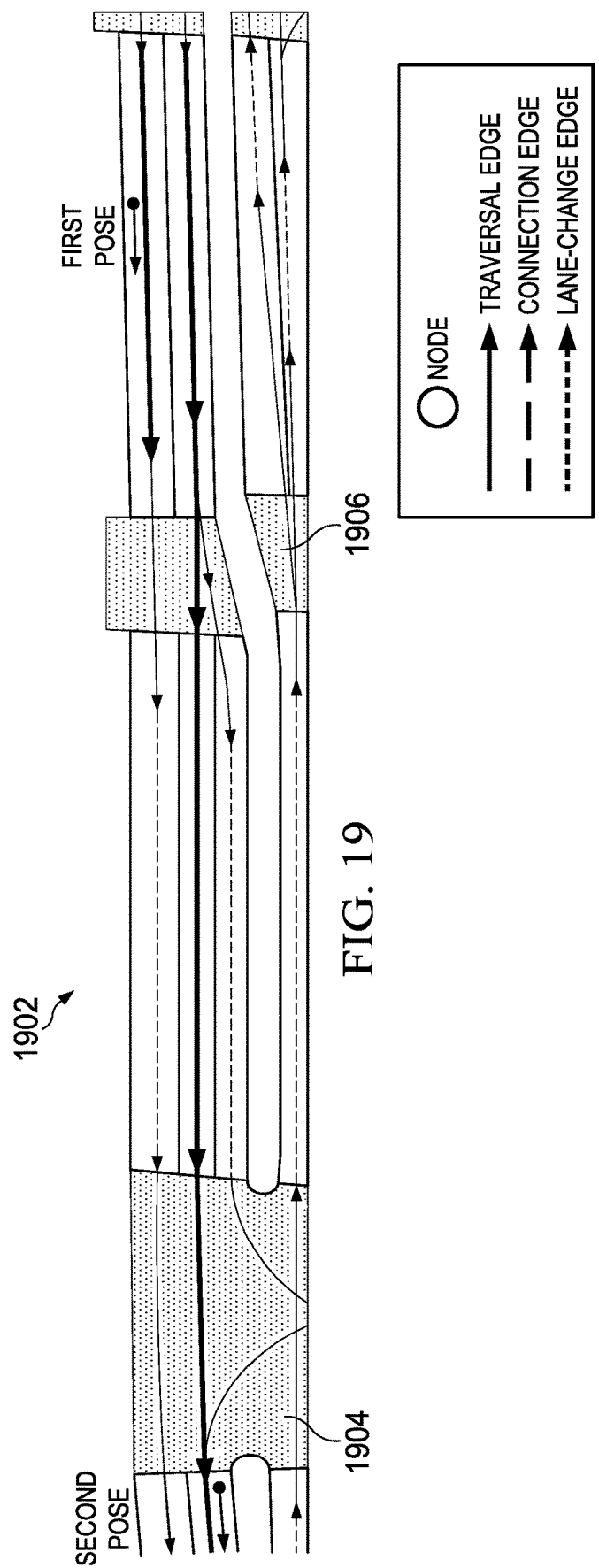
FIG. 19 is a schematic diagram of an example of a third example of a trajectory on which the autonomous vehicle can travel.
Figure 20:
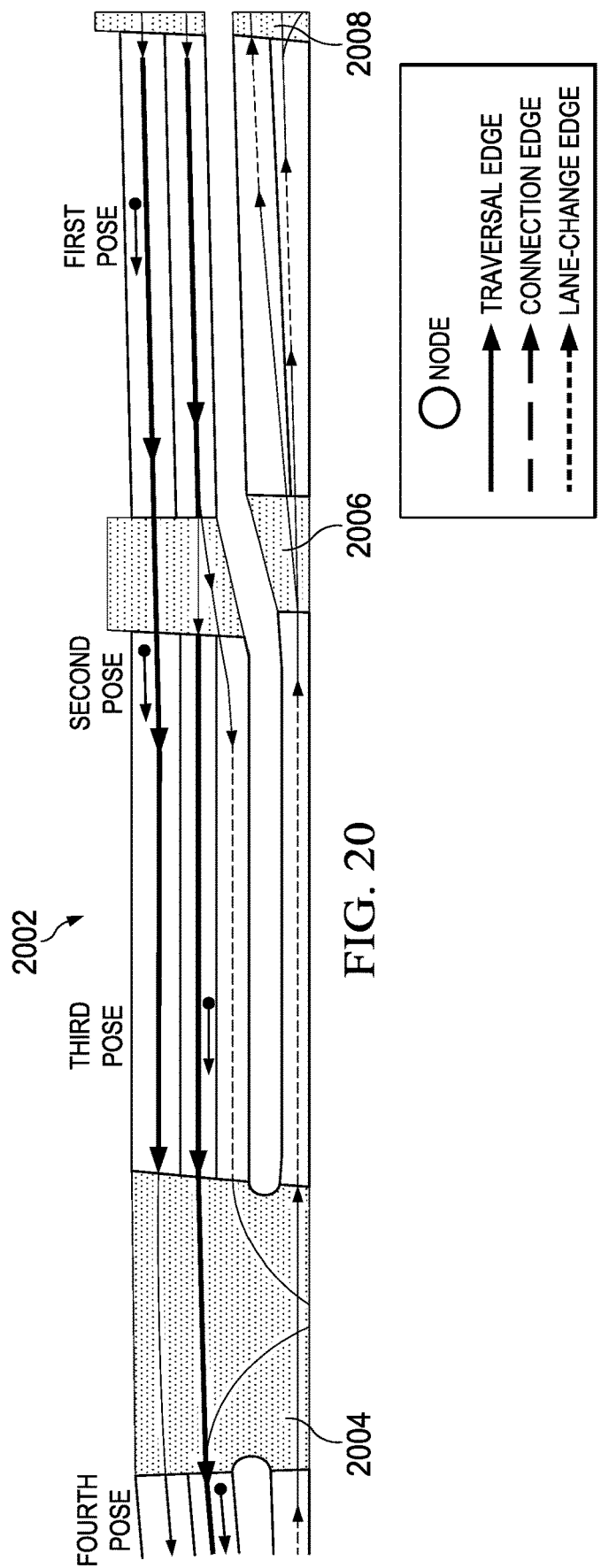
FIG. 20 is a schematic diagram of an example of a fourth example of a trajectory on which the autonomous vehicle can travel.

When there is no existing route, e.g., when the planning module 304 is first initialized or when the destination location is replaced, the planning module 304 uses the current pose of the vehicle to determine the starting node on the lane graph. The planning module 304 further uses the first destination location to determine the ending node of the route. When a route exists and a new destination location is received to extend the route further, the planning module 304 uses the last lane graph node of the existing route as the starting node of the extending route. The planning module 304 also uses the added destination location to determine the ending node of the lane graph route. Because lane change edge on the lane change graph is available only from lane starting node to lane starting node, to force a lane change on a specific lane, e.g., from starting lane to finishing lane, a destination location must be sent to the incoming lane connector of the starting lane and a destination location must be sent to the finishing lane. FIG. 19 is a schematic diagram of an example of a third example of a trajectory 1902 on which the AV 100 can travel. The trajectory 1902 is a lane change between two road blocks 1904 and 1906. FIG. 20 is a schematic diagram of an example of a fourth example of a trajectory 2002 on which the autonomous vehicle can travel. The trajectory 2002 is a pose sequence that forces a lane change at the middle road block 2006 of three road blocks 2004, 2006 and 2008 instead of the first road block 2008.

The destination location will always be at least one road block away except when the goal is the final goal of the route. At the lane changing road block, both the baseline sequence of the starting lane and the ending lanes are injected. It is possible to have multiple lane changes in the same road block. In such cases, the corresponding baseline of all the lanes during the lane change will be injected. Lane change helper transitions are injected from the starting lane to the ending lane as non-baseline transitions to ensure that the planning module 304 always has a path to the destination location. In cases of multiple lane changes in the same road block, lane change helper transitions will be injected between each pair of lanes from starting lane towards the ending lane. An intermediate destination is default to the ending baseline node of each lane/lane connector. An exception is at the end of each route segment, where the destination location is set to the final destination location to generate the route segment.

Figure 21:
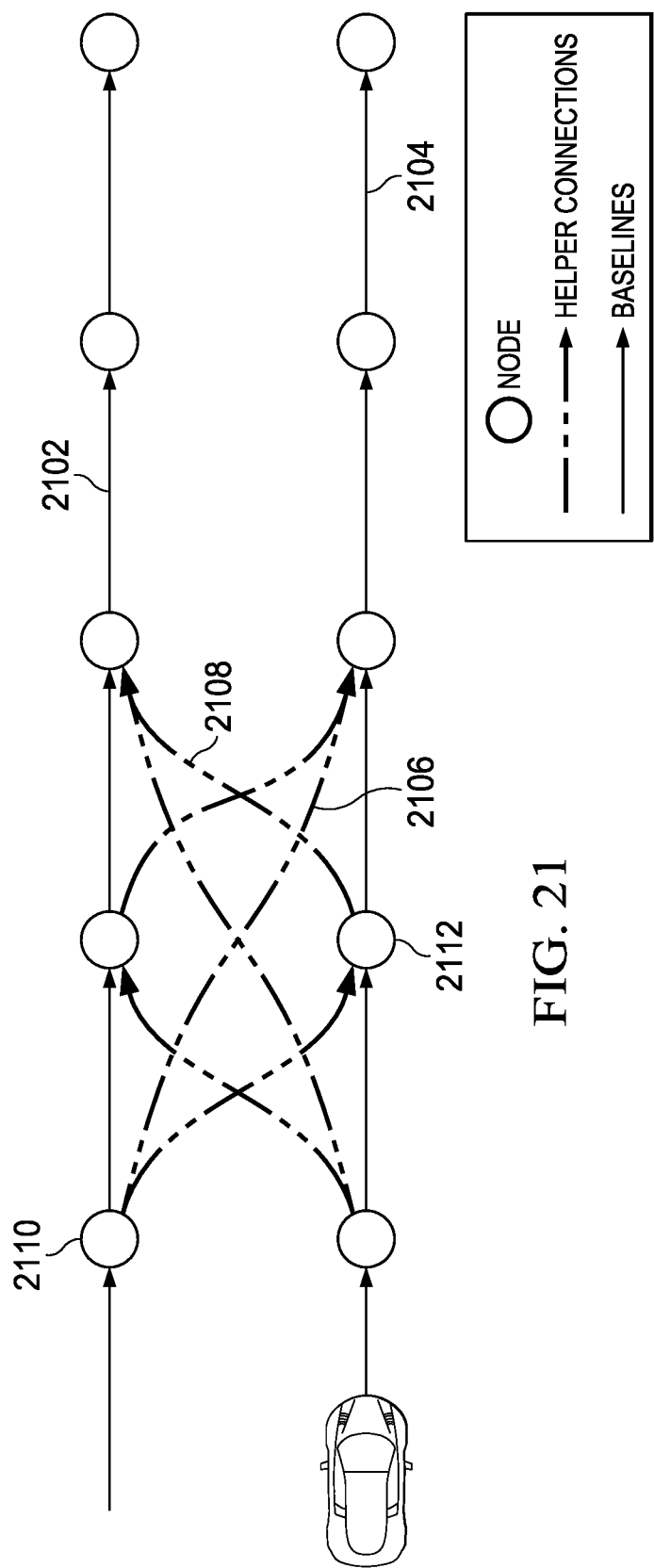
FIG. 21 is a schematic diagram of inter-baseline connections representing possible trajectories for the autonomous vehicle to travel from one lane to an adjacent lane.

FIG. 21 is a schematic diagram of inter-baseline connections representing possible trajectories for the AV 100 to travel from one lane to an adjacent lane. FIG. 21 shows two baselines (2102 and 2104) with helper connections (e.g., 2106, 2108). The planning module 304 injects helper connections (sometimes called inter-baseline connections) in a receding horizon fashion with the horizon, e.g., the distance ahead of the AV 100, being pre-defined. For each baseline node, the planning module 304 adds helper connections from the node, e.g., node 2110 on baseline 2102, to one or more nodes, e.g., node 2112 on baseline 2104, within the same group and within the horizon.

Figure 22:
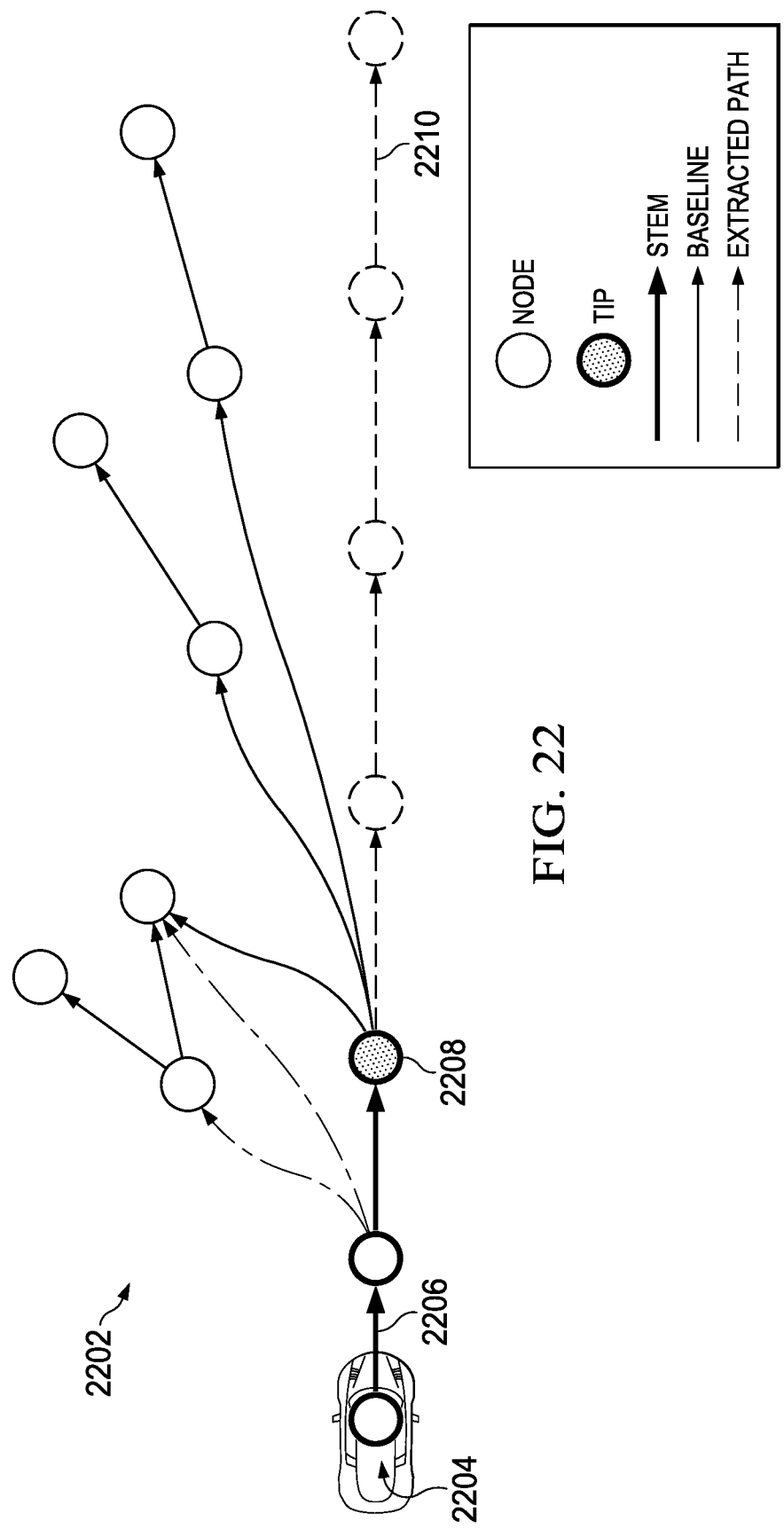
FIG. 22 is a schematic diagram of stem-splitting and trimming of a trajectory.
Figure 23:
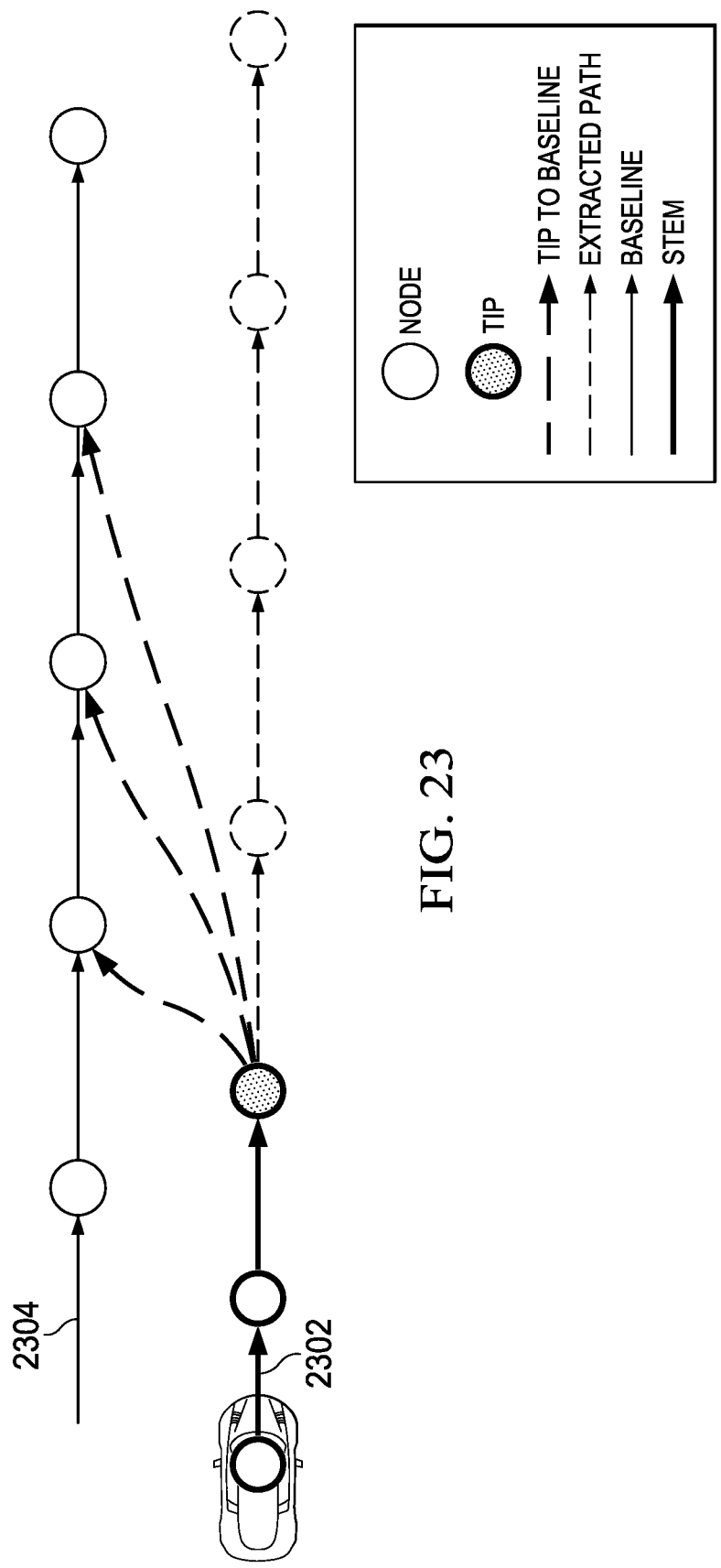
FIG. 23 is a schematic diagram of stem to baseline connections.

FIG. 22 is a schematic diagram of stem-splitting and trimming of a trajectory 2202. Each route generated by the planning module 304, e.g., route 2202, can include a root, e.g., route 2204 and a stem, e.g., 2206. The stem is a portion of the selected trajectory to which the vehicle is configured to adhere. The planning module 304 can determine the length of the stem by the current velocity, the velocity profile for the future produced by a velocity profile optimizer and an amount of time to be committed to traveling on the stem. In some implementations, the stem can be half of the length of the length of the trajectory. In some implementations, the length of the stem can range from $\frac{1}{3}^{rd}$ to $\frac{2}{3}^{rd}$ of the length of the trajectory. That is, once the planning module 304 identifies the route 2202 as the route to be traveled, the AV 100 commits to traveling at least to a tip 2208 of the stem 2206 of the route 2202 before deviating from the route 2202. After traveling at least the stem 2206, the AV 100 can continue to travel the same trajectory 2202 or can select a different route to travel, e.g., a helper connection to a different baseline. A longer stem increases a stability of the AV 100 but decreases its agility.

FIG. 15 is a schematic diagram of stem to baseline connections. The connection represents a motion plan for the AV 100 to return to a baseline 2302 from another baseline 2304. The planning module 304 makes the connections from the tip of the stem to all baseline nodes ahead of the AV 100 within the pre-defined horizon. Where there are multiple baseline sequences within the baseline group, stem to baseline connections connect to all baseline sequences to provide lane changing motion plan along with the inter-baseline connections.

Figure 24:
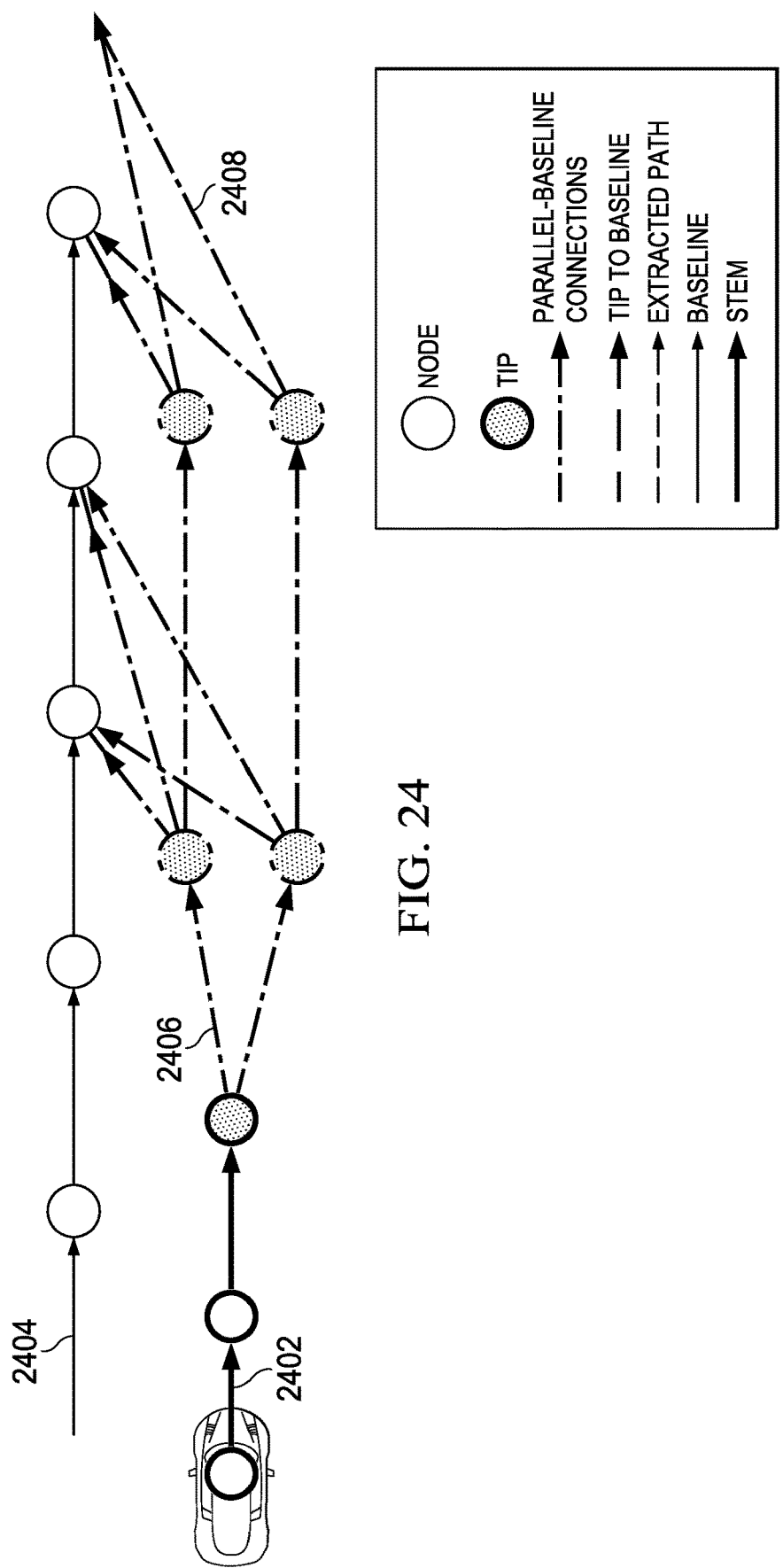
FIG. 24 is a schematic diagram of parallel-baseline connections from a trajectory.

FIG. 24 is a schematic diagram of parallel-baseline connections from a trajectory 2402. Parallel baseline tracks, e.g., tracks 2406, 2408, represent the motion plan of deviating from the baseline, e.g., the baseline 2402, traveling parallel to the baseline (with different lateral offsets) and then returning to the baseline 2404 after certain longitudinal distances. The number of tracks and the lateral distances of the tracks can be pre-defined and stored. The direction of the tracks can, e.g., to the left or the right of the baseline, can be based on the driving rules for passing adjacent vehicles within the geographic area. Each parallel-baseline track can have multiple exit points or key vertices spread longitudinally that connects back to the baseline. The vertices are connected to all baseline nodes within a pre-defined horizon. In some implementations, the tracks can be injected into the motion graph in a receding horizon fashion.

Figure 25:
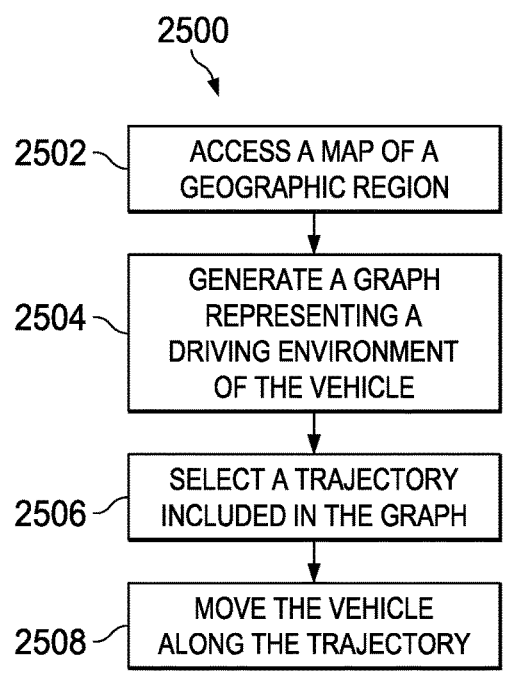
FIG. 25 is a flowchart of an example of a process for identifying a trajectory for the autonomous vehicle to travel.

FIG. 25 is a flowchart of an example of a process 2500 for identifying a trajectory for the autonomous vehicle to travel. In some implementations, the process 2500 can be implemented by the planning module 304. At 2502, a map of a geographic region is accessed. The map includes information identifying at least one lane on which vehicles can travel in the geographic region. At 2504, a graph of a driving environment of the vehicle is generated. The graph includes multiple trajectories. At least one trajectory includes a lane change. Each trajectory is a path for the vehicle to autonomously move from a first spatiotemporal location on the map to a second spatiotemporal location on the map. The trajectory includes at least one lane along which the vehicle can move. The trajectory includes at least one lane along which the vehicle can move. At 2506, a trajectory of the multiple trajectories is selected for the vehicle to travel based on an initial vehicle trajectory of the vehicle. The selected trajectory includes a stem, which is a portion of the selected trajectory to which the vehicle adheres. At 2508, the vehicle is moved along the selected trajectory.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method comprising:
    identifying, using a hardware processor, a first lane-starting node in a first lane from a graph representing a driving environment of a vehicle, the first lane-starting node representing a first starting spatiotemporal location in the first lane;
    identifying, using the hardware processor, second lane-starting nodes in a second lane from the graph representing the driving environment, wherein a respective second lane-starting node represents a corresponding second starting spatiotemporal location in the second lane;
    generating, using the hardware processor, lane-change edges connecting the first lane-starting node and the second lane starting nodes, wherein a respective lane-change edge crosses the first lane and the second lane;
    selecting, using the hardware processor, a trajectory for the vehicle, the selected trajectory comprising at least one lane-change edge from the generated lane-change edges based on a cost function; and causing, using the hardware processor, the vehicle to travel along the selected trajectory.

2. The method of claim 1, wherein the cost function comprises a weighted sum of a path length cost and a maneuver cost.

3. The method of claim 2, wherein a weight for the weighted sum comprises a value determined based on a comparison of a cost for one lane change and a cost of traveling additional distances.

4. The method of claim 2, wherein the cost function comprises a lane-change penalty cost that is a difference between a length of longest lane in the driving environment and a shorter of a length of the starting and ending lane of the lane-change edge divided by a difference between the length of the longest lane in the driving environment and a length of the shortest lane in the driving environment.

5. The method of claim 1, wherein selecting a trajectory comprises selecting a trajectory based on factors affecting movement of the vehicle from the first lane-starting node to the respective second lane-starting node, wherein the factors comprise one or more of a shortest distance between the first lane-starting node and the second lane-starting node, a shortest time to travel between the first lane-starting node and the respective second lane-starting node, speed constraints to travel in the first lane or the second lane, and driving conditions in the driving environment.

6. The method of claim 5, further comprising generating a sequence comprising the lane-change edge from the first starting node to the respective second lane-starting node and a traversal edge from the respective second lane-starting node to a first ending node, the first ending node representing a first ending spatiotemporal location in the second lane.

7. The method of claim 1, wherein the graph is a first graph corresponding to a first geographic area, and wherein the method further comprises, while the vehicle is traveling in the first geographic area represented by the driving environment:

determining a second geographic area adjacent the first geographic area to be traveled by the vehicle at a future time instant; and generating a second graph of a driving environment representing the second geographic area.

8. The method of claim 7, further comprising generating the second graph in real time.

9. The method of claim 1, wherein generating the graph comprises assigning a weight to respective trajectories of a plurality of trajectories, the weight representing resources consumed by the vehicle to travel the respective trajectory.

10. The method of claim 9, wherein assigning the weight to the respective trajectory comprises assigning a greater weight to a trajectory representing a lane change in a short road block compared to a weight assigned to a trajectory representing the lane change in a comparatively longer road block.

11. The method of claim 1, wherein the trajectory is selected from a plurality of trajectories for the vehicle to travel based on an initial vehicle trajectory that minimizes resources consumed by the vehicle to travel from the first spatiotemporal location to the second spatiotemporal location, wherein the initial vehicle trajectory represents a location and a travel direction of the vehicle at a time instant of selecting the trajectory.

12. The method of claim 1, wherein the trajectory is selected from a plurality of trajectories for the vehicle to travel comprising a stem, wherein the stem is a portion of the selected trajectory to which the vehicle is configured to adhere.

13. A system, comprising:

at least one processor, and at least one non-transitory storage media storing instructions that, when executed by the at least one processor, cause the at least one processor to:

identify a first lane-starting node in a first lane from a graph representing a driving environment of a vehicle, the first lane-starting node representing a first starting spatiotemporal location in the first lane;

identify second lane-starting nodes in a second lane from the graph representing the driving environment, wherein a respective second lane-starting node represents a corresponding second starting spatiotemporal location in the second lane;

generate lane-change edges connecting the first lane-starting node and the second lane starting nodes, wherein a respective lane-change edge crosses the first lane and the second lane;

select a trajectory for the vehicle, the selected trajectory comprising at least one lane-change edge from the generated lane-change edges based on a cost function; and cause the vehicle to travel along the selected trajectory.

14. The system of claim 13, wherein selecting a trajectory comprises selecting a trajectory based on factors affecting movement of the vehicle from the first lane-starting node to the second lane-starting nodes, wherein the factors comprise one or more of a shortest distance between the first lane-starting node and the respective second lane-starting node, a shortest time to travel between the first lane-starting node and the respective second lane-starting node, speed constraints to travel in the first lane or the second lane, and driving conditions in the driving environment.

15. The system of claim 14, further comprising generating a sequence comprising the lane-change edge from the first lane-starting node to the respective second lane-starting node and a traversal edge from the respective second lane-starting node to a first ending node, the first ending node representing a first ending spatiotemporal location in the second lane.

16. At least one non-transitory storage media storing instructions that, when executed by at least one processor, cause the at least one processor to:

identify a first lane-starting node in a first lane from a graph representing a driving environment of a vehicle, the first lane-starting node representing a first starting spatiotemporal location in the first lane;

identify second lane-starting nodes in a second lane from the graph representing the driving environment, wherein a respective second lane-starting node represents a corresponding second starting spatiotemporal location in the second lane;

generate lane-change edges connecting the first lane-starting node and the second lane starting nodes, wherein a respective lane-change edge crosses the first lane and the second lane;

select a trajectory for the vehicle, the selected trajectory comprising at least one lane-change edge from the generated lane-change edges based on a cost function; and cause the vehicle to travel along the selected trajectory.

17. The at least one non-transitory storage media of claim 16, comprising selecting a trajectory based on factors affecting movement of the vehicle from the first lane-starting node to the respective second lane-starting node, wherein the factors comprise one or more of a shortest distance between the first lane-starting node and the respective second lane-starting node, a shortest time to travel between the first lane-starting node and the respective second lane-starting node, speed constraints to travel in the first lane or the second lane, and driving conditions in the driving environment.

18. The at least one non-transitory storage media of claim 16, comprising causing the vehicle to generate a sequence comprising the lane-change edge from the first lane-starting node to the respective second lane-starting node and a traversal edge from the second lane-starting node to a first ending node, the first ending node representing a first ending spatiotemporal location in the second lane.

* * * * *